United States Patent
Harada et al.

(10) Patent No.: US 10,728,810 B2
(45) Date of Patent: Jul. 28, 2020

(54) USER TERMINAL AND RADIO COMMUNICATION METHOD

(71) Applicant: NTT DOCOMO, INC., Tokyo (JP)

(72) Inventors: Hiroki Harada, Tokyo (JP); Satoshi Nagata, Tokyo (JP); Jing Wang, Beijing (CN); Liu Liu, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/475,482

(22) PCT Filed: Jan. 5, 2018

(86) PCT No.: PCT/JP2018/000055
§ 371 (c)(1),
(2) Date: Jul. 2, 2019

(87) PCT Pub. No.: WO2018/128185
PCT Pub. Date: Jul. 12, 2018

(65) Prior Publication Data
US 2019/0342807 A1    Nov. 7, 2019

(30) Foreign Application Priority Data

Jan. 6, 2017  (JP) ................................ 2017-001438

(51) Int. Cl.
*H04W 36/00* (2009.01)
*H04W 72/08* (2009.01)

(52) U.S. Cl.
CPC . *H04W 36/00837* (2018.08); *H04W 36/0072* (2013.01); *H04W 72/085* (2013.01)

(58) Field of Classification Search
CPC .... H04B 7/0695; H04B 7/088; H04B 7/0617; H04B 7/0408; H04B 17/309; H04B 17/318; H04B 17/382; H04B 7/0632; H04B 7/0697; H04W 72/046; H04W 16/28; H04W 24/10; H04W 48/10; H04W 24/04;
(Continued)

(56) References Cited

U.S. PATENT DOCUMENTS

2017/0034730 A1* 2/2017 Zhang ................... H04W 24/08
2018/0007577 A1* 1/2018 Guo ....................... H04W 36/30
(Continued)

FOREIGN PATENT DOCUMENTS

WO    2018034698 A1    2/2018

OTHER PUBLICATIONS

"Discussion on Beam Measurement and Tracking for 5G New Radio Interface in mmWave Frequency Bands" (R2-162226) by Samsung, Apr. 11, 2016 (Year: 2016).*
(Continued)

*Primary Examiner* — Daniel Lai
(74) *Attorney, Agent, or Firm* — Osha Liang LLP

(57) ABSTRACT

A user terminal is disclosed, which includes a receiver that receives a signal, and a processor that obtains a measurement result for one or more beams, based on the signal, before applying layer 3 filtering, and obtains a cell level measurement result based on the measurement result for the one or more beams. The one or more beams are up to a maximum of N beams having a quality that exceeds a threshold, and the number N is notified to the user terminal.

3 Claims, 16 Drawing Sheets

(58) Field of Classification Search
CPC . H04W 24/02; H04W 36/0083; H04W 36/06; H04W 72/12; H04W 72/1231; H04W 36/0085; H04W 74/00; H04W 74/002; H04W 36/00837; H04W 36/0072; H04W 72/085
See application file for complete search history.

(56) References Cited

U.S. PATENT DOCUMENTS

| | | | |
|---|---|---|---|
| 2018/0042000 A1* | 2/2018 | Zhang | H04B 7/04 |
| 2018/0069606 A1* | 3/2018 | Jung | H04B 7/0408 |
| 2019/0200347 A1* | 6/2019 | Ryu | H04W 72/0413 |

OTHER PUBLICATIONS

International Search Report issued in PCT/JP2018/000055 dated Feb. 27, 2018 (2 pages).

Written Opinion of the International Searching Authority issued in PCT/JP2018/000055 dated Feb. 27, 2018 (4 pages).

MediaTek Inc.; "Consolidation of Multiple Beams for DL Measurements"; 3GPP TSG-RAN WG2 Meeting #96, U-168000; Reno, USA; Nov. 14-18, 2016 (5 pages).

Samsung; "RRM Measurement Model in NR"; 3GPP TSG RAN WG2 #96, R2-168041; Reno, USA; Nov. 14-18, 2016 (5 pages).

Huawei, HiSilicon; "Measurement and Mobility in high frequency"; 3GPP TSG-RAN2 Meeting #96, R2-168255; Reno, Nevada, USA; Nov. 14-18, 2016 (4 pages).

Nokia, Alcatel-Lucent Shanghai Bell; "Downlink Mobility Measurements in Connected Mode"; 3GPP TSG-RAN WG2 Meeting#96, R2-167711; Reno, USA; Nov. 14-18, 2016 (6 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

Extended European Search Report issued in the counterpart European Patent Application No. 18735939.3, dated Oct. 14, 2019 (13 pages).

* cited by examiner

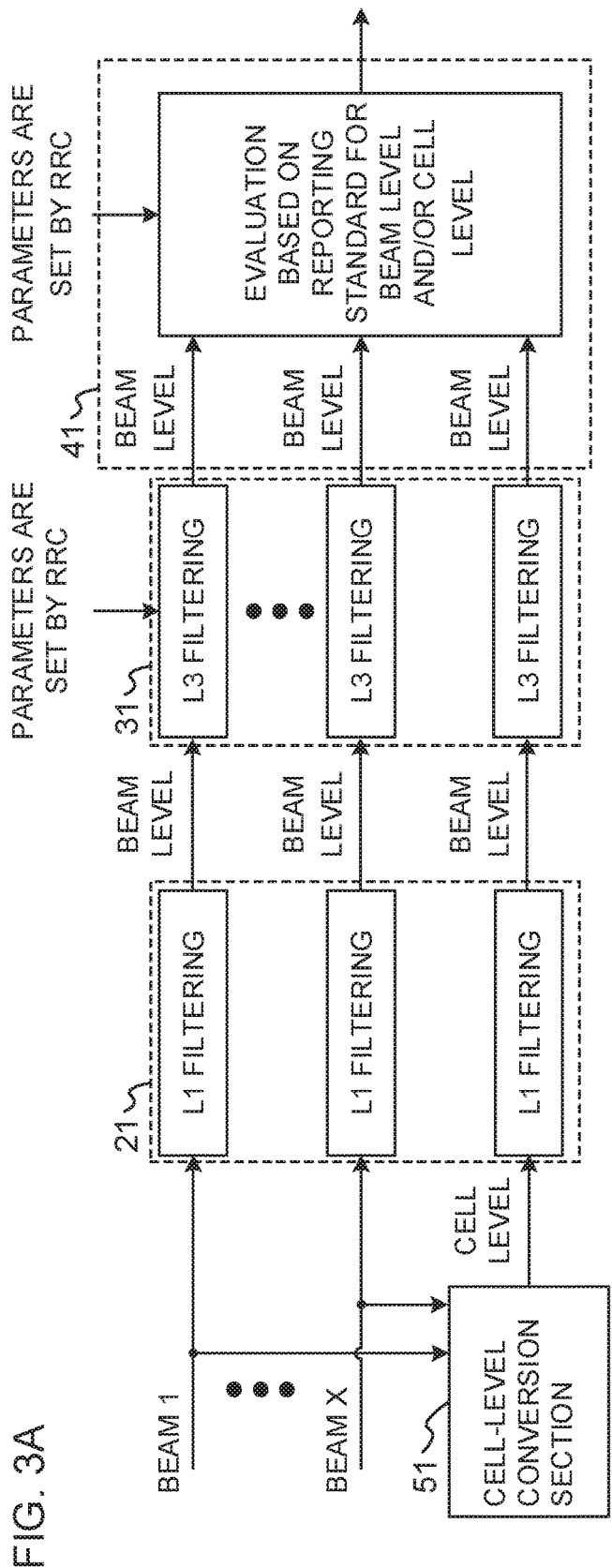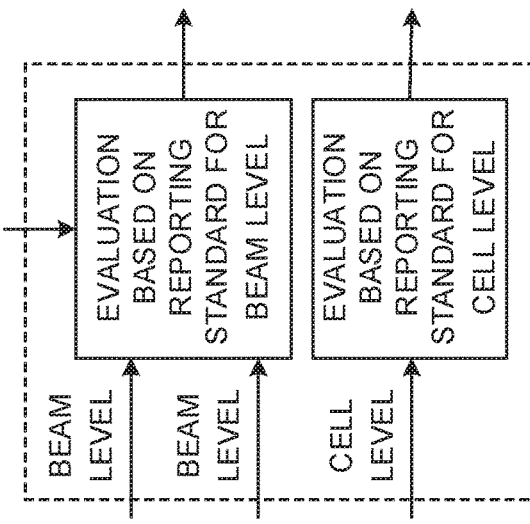
FIG. 3A
FIG. 3B

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). Also, the specifications of LTE-A (also referred to as "LTE-advanced," "LTE Rel. 10," "LTE Rel. 11," "LTE Rel. 12" or "LTE Rel. 13") have been drafted for further broadbandization and increased speed beyond LTE (also referred to as "LTE Rel. 8" or "LTE Rel. 9"), and successor systems of LTE (also referred to as, for example, "FRA (Future Radio Access)," "5G (5th generation mobile communication system)," "NR (New Radio)," "NX (New radio access)," "FX (Future generation radio access)," "LTE Rel. 14," "LTE Rel. 15" or later versions) are under study.

In LTE Rel. 10/11, carrier aggregation (CA) to integrate multiple component carriers (CC) is introduced in order to achieve broadbandization. Each CC is configured with the system bandwidth of LTE Rel. 8 as one unit. Furthermore, in CA, a plurality of CCs of the same base station (referred to as an "eNB (evolved Node B)," a "BS (Base Station)" and so on) are configured in a user terminal (UE: User Equipment).

Meanwhile, in LTE Rel. 12, dual connectivity (DC), in which multiple cell groups (CGs) formed by different radio base stations are configured in a UE, is also introduced. Each cell group is comprised of at least one cell (CC). In DC, since multiple CCs of different radio base stations are integrated, DC is also referred to as "inter-eNB CA."

Also, in existing LTE systems (for example, LTE Rel. 8 to 13), the synchronization signals (PSS, SSS, etc.), broadcast channel (PBCH) and so on which a user terminal uses in initial access procedures are allocated to fields that are determined in advance on a fixed basis. By detecting the synchronization signals in cell search, the user terminal can establish synchronization with the network, and, furthermore, identify the cell (for example, cell ID) which the user terminal should connect with. Furthermore, the user terminal can acquire system information by receiving the broadcast channel (PBCH, SIB) after the cell search.

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Future radio communication systems (for example, 5G, NR, etc.) are expected to realize various radio communication services so as to fulfill mutually varying requirements (for example, ultra high speed, large capacity, ultra-low latency, etc.).

For example, NR is under study to provide radio communication services referred to as "eMBB (enhanced Mobile Broad Band)," "mMTC (massive Machine Type Communication)," "URLLC (Ultra Reliable and Low Latency Communications)," and so on.

In NR, study is in progress to provide services using a very high carrier frequency of 100 GHz, for example. Generally, it becomes more difficult to secure coverage as the carrier frequency increases. The reasons for this include that the distance-induced attenuation becomes more severe and the rectilinearity of radio waves becomes stronger, the transmission power density decreases because ultra-wideband transmission is performed, and so on.

Therefore, in order to meet the demands of the above-noted various types of communication even in high frequency bands, study is in progress to use massive MIMO (massive MIMO (Multiple Input Multiple Output)), which uses a very large number of antenna elements. When a very large number of antenna elements are used, beams (antenna directivity) can be formed by controlling the amplitude and/or the phase of the signals transmitted/received from each element. This process is also referred to as "beam forming (BF)," and it becomes possible to reduce the propagation loss of radio waves.

Meanwhile, in NR, a scenario is under study, in which cells are comprised of multiple beams (multi-beam scenario). However, in the multi-beam scenario, it is necessary to measure cell-level quality and send measurement reports in order to select appropriate cells, The present invention has been made in view of the above, and it is therefore an object of the present invention to provide a user terminal and a radio communication method, whereby cell-level measurement results can be reported properly even when multiple beams are applied.

According to one aspect of the present invention, a user terminal has a receiving section that receives a signal, and a measuring section that obtains a measurement result for one or more beams, based on the signal and obtains a cell level measurement result based on the measurement result for the one or more beams.

Advantageous Effects of Invention

According to the present invention, even when multiple beams are applied, cell-level measurement results can be adequately acquired, so that cells can be selected/reselected adequately.

BRIEF DESCRIPTION OF DRAWINGS

FIG. 3A is a diagram to show a measurement model in a user terminal according to a first embodiment, and FIG. 3B is a diagram to show a variation of an evaluation section;

DESCRIPTION OF EMBODIMENTS

Figure 1:
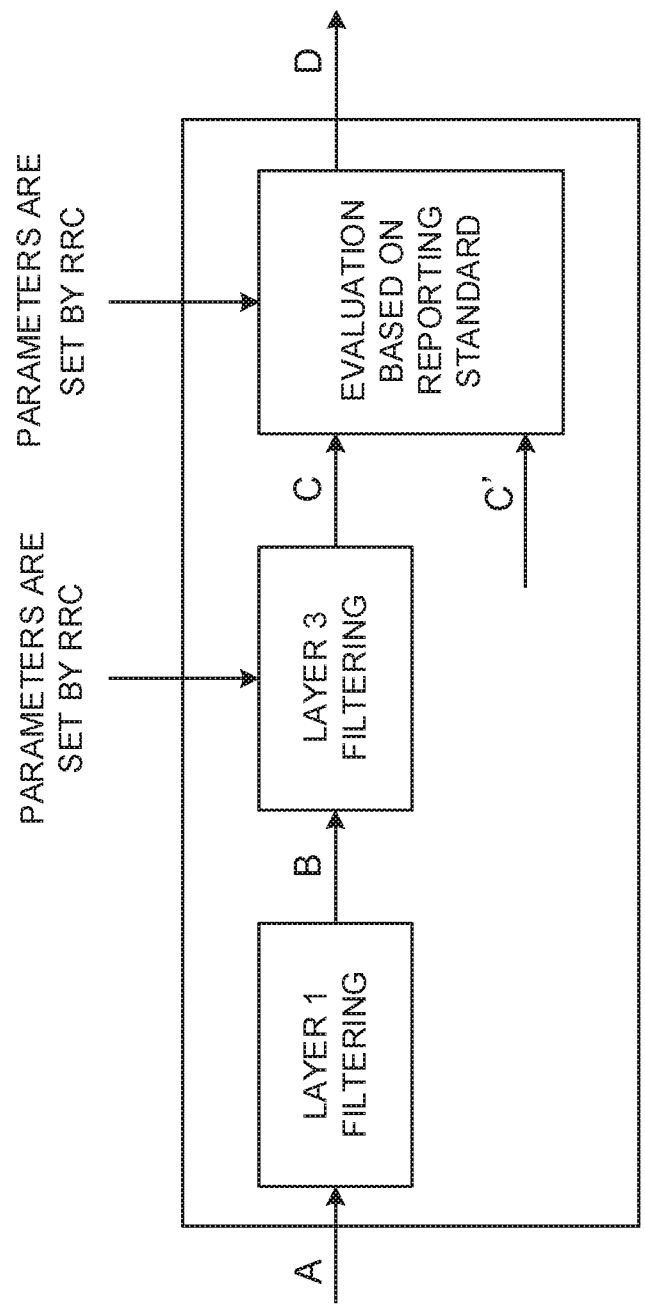
FIG. 1 is a diagram to show a measurement model in cell-level measurement.

Future radio communication systems are expected to realize various radio communication services so as to fulfill mutually varying requirements (for example, ultra-high speed, large capacity, ultra-low latency, etc.). For example, for future radio communication systems, as mentioned earlier, study is in progress to perform communication using beam forming (BF).

BF can be classified into digital BF and analog BF. Digital BF refers to a method of performing precoding signal processing on the baseband (for digital signals). In this case, inverse fast Fourier transform (IFFT)/digital-to-analog conversion (DAC)/RF (Radio Frequency) need to be carried out in parallel processes, as many as the number of antenna ports (RF chains). Meanwhile, it is possible to form a number of beams according to the number of RF chains at an arbitrary timing.

Analog BF refers to a method of using phase shifting devices on RF. In this case, since it is only necessary to rotate the phase of RF signals, analog BF can be realized with simple and inexpensive configurations, but it is nevertheless not possible to form a plurality of beams at the same time. To be more specific, when analog BF is used, each phase shifting device can only form one beam at a time.

Therefore, if a base station (referred to as "evolved Node B (eNB)," "BS (Base Station)," "gNB," etc.) has only one phase shifting device, only one beam can be formed at a given time. Therefore, when multiple beams are transmitted using analog BF alone, it is not possible to simultaneously transmit these beams using the same time resources, and therefore the beams need to be switched in time, be rotated, and so on.

Note that it is also possible to adopt a hybrid BF configuration which combines digital BF and analog BF. Although study is in progress to introduce massive MIMO in future radio communication systems (for example, 5G), if it is attempted to form an enormous number of beams with digital BF alone, the circuit configuration becomes expensive. For this reason, 5G is assumed to use analog BF configurations or hybrid BF configurations.

As for BF operations, there are single-BF operation using one BF, and multiple-BF operation using multiple BFs.

Also, in NR, as an L1/L2 beam control method to apply to the scenario (multi-beam scenario) in which cells are formed with multiple beams, study is in progress to send measurement reports for beam selection by using the CSI-RS (CSI measurement RS) or the mobility reference signal (MRS).

Here, the MRS has only to be a signal that can be used as an RRM measurement RS, and may be an existing synchronization signal (for example, PSS/SSS), an existing reference signal (for example, the CRS, the CSI-RS, etc.), or a signal that is obtained by extending/modifying these signals. For example, the MRS may be the PSS for NR (NR-PSS) and/or the SSS for NR (NR-SSS), or may be a new reference signal that is designed for RRM measurement. The MRS may be transmitted in one or more beams using one or more antenna ports. Also, the MRS may be referred to as a "measurement signal," "beam-specific RS," "RS to be transmitted per beam" and so on, Note that, in an RRM measurement report, a UE may report information related to received power (for example, RSRP (Reference Signal Received Power)). In a CSI measurement report, the UE may report CSI related to at least one of a channel quality indicator (CQI), a precoding matrix indicator (PMI), a precoding type indicator (PTI), a rank indicator (RI) and so on. Note that, in the present specification, the phrase "measure and report" may be used interchangeably with the phrase "measure and/or report."

Now, in existing LTE systems (for example, LTE Rel. 13), due to the mobility (L3 mobility) that requires RRC signaling, a UE measures and reports the quality of cells by using reference signals (for example, CRSs). This measurement is made per cell, therefore also referred to as "cell-level measurement."

FIG. 1 shows the measurement model in conventional cell-level measurements. A user terminal receives the measurement signals (to which beam forming is not applied) transmitted in cells, in the physical layer. Layer 1 filtering is applied to the measurement values measured in the physical layer, shown at point A. Although the method of layer 1 filtering is a matter of design, for example, filtering may be applied by performing measurements on a plurality of samples. Layer 1 filtering needs not be applied if the terminal can satisfy the quality requirement stipulated in the specification without applying layer 1 filtering.

After layer 1 filtering, the measurement results are reported from layer 1 to layer 3. Layer 3 filtering is applied to the measurement results provided to point B. Layer 3 filtering may be specified in the standard, and the required parameters are configured through RRC signaling. To be more specific, in layer 3 filtering, the latest measurement results and the past measurement results are smoothed.

Using the measurement results provided to point C (and/or point C', which will be described later), whether or not measurement results need to be reported is evaluated. Note that, there may be a plurality of measurement flows, and C' is merely shown as an example. The evaluation criteria may be stipulated in the standard, and the required parameters may be configured through RRC signaling. Measurement results that satisfy the evaluation criteria are supplied to point D, and transmitted to the radio interface.

Now, in NR, there is an agreement to measure and report at least one of cell quality and beam quality, using the MRS, NR synchronization signals or other reference signals, for mobility that requires RRC signaling (L3 Mobility). Beam measurements are made on a per beam basis, therefore also referred to as "beam-level measurements."

In the multi-beam scenario, it is agreed that a user terminal reports cell-level measurement results in idle mode and reports at least one of cell-level measurement results and beam-level measurement results in connected mode. Therefore, if the user terminal is in idle mode, L3 mobility is implemented based on cell-level measurement results, while, if the user terminal is in connected mode, L3 mobility is implemented based on at least one of cell-level measurement results and beam-level measurement results.

Under the multi-beam scenario, when a user terminal in idle mode performs RRM measurements, the case might occur where the user terminal cannot identify individual beams (case 1), or the case might occur where the user terminal can identify individual beams by using some method (case 2).

For example, if cell-specific MRSs that are scrambled based on cell identifiers (which may be referred to as "physical cell IDs (PCI)," "cell IDs" and so on) are used for RRM measurements, a user terminal in idle mode is likely to be unable to distinguish between individual beams (case 1).

Furthermore, in the case where, although cell IDs are contained in cell-specific MRSs, the beams and resources are linked in advance so that the beams can be specified from the resources, or in the case where beam-specific MRSs are used for RRM measurements, even a user terminal in idle mode can specify beams (case 2).

Meanwhile, a user terminal in connected mode can perform RRM measurements using cell-specific MRSs or beam-specific MRSs. It is likely that a user terminal, as long as it is in connected mode, can acquire beam information from base stations, and therefore can specify individual beams (case 3).

However, while, in any of above-described cases 1 to 3, measurement results of individual beams can be obtained, the problem lies in how to obtain cell-level measurement results from the beam-specific measurement results.

Figure 2:
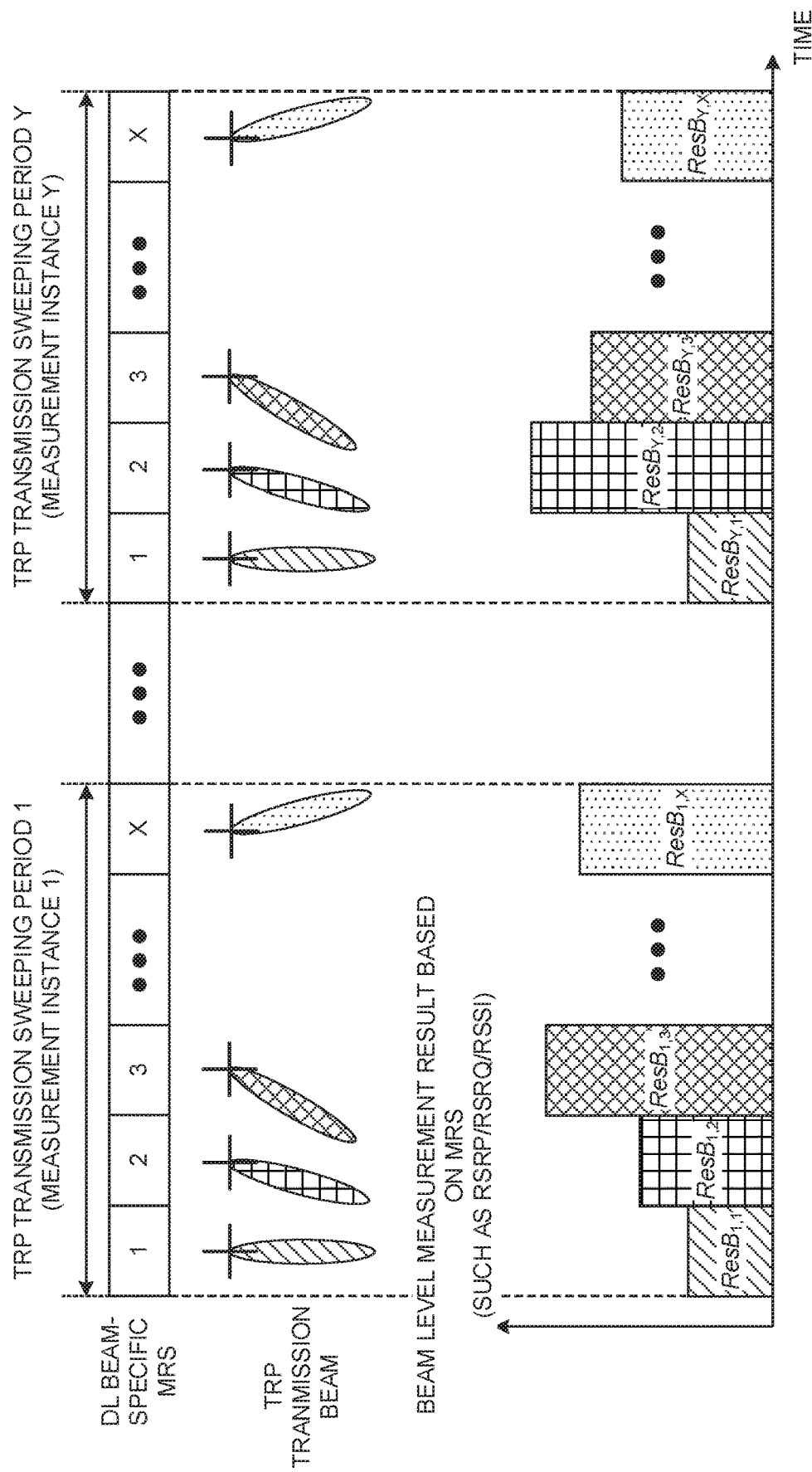
FIG. 2 is a diagram to explain the concept of multi-beam transmission in a cell adopting multi-beam operation.

FIG. 2 gives a schematic view, in which DL beam-specific MRSs are transmitted while switching between beams in a cell employing multi-beam operation. Transmission sweeping periods 1 to Y continue in the time axis direction, to meet measurement instances 1 to Y. In one sweeping period, DL beam-specific MRSs are transmitted X times by switching between beams.

When the user terminal can identify between multiple beams individually, the user terminal can obtain beam-level measurement results based on DL beam-specific MRSs on a per beam basis (case 2 or 3). For example, RSRP can be used as beam-level measurement results based on DL beam-specific MRSs, but RSRQ, RSSI and/or other measurement values can be used as well. FIG. 2 shows beam-level measurement results $ResB_{i,j}$, which correspond to individual beams. "i" is the measurement instance index, and "j" is the beam index.

In sweeping period 1 of measurement instance 1, a user terminal can obtain beam-level measurement result $ResB_{1,1}$ from the DL beam-specific MRS transmitted with the beam of beam index 1, so that the user terminal can obtain beam-level measurement results $ResB_{1,2}$ ... $ResB_{1,X}$, from the DL beam-specific MRSs transmitted with the beams of beam index 2 to beam index X. In measurement instances 1 to Y, the above-noted RRM measurements are repeated X times in each measurement instance.

As a result of the above RRM measurements, a number of beam-level measurement results $ResB_{i,j}$ to match "the number of measurement instances×the maximum beam index value" are obtained from one cell adopting multi-beam operation. However, since individual beam-level measurement result $ResB_{i,j}$ only indicates the quality of one beam that is transmitted locally within the cell, it is insufficient as an indicator of the quality of the entire cell. Unless how to obtain cell-level measurement results in the multi-beam scenario is stipulated, it becomes not possible to select cells adequately, and the throughput may be deteriorated.

Therefore, the present inventors have focused on the fact that, in a cell that adopts multi-beam operation, beam-level measurement results alone are insufficient as an indicator to show the quality of the entire cell, and come up with the idea of deriving a cell-level measurement result from measurement results pertaining to one or more beams.

For example, according to one example of the present embodiment, the user terminal obtains a cell-level measurement result based on measurement results pertaining to one or more beams. By this means, cell-level measurement results can be obtained even when multiple beams are applied, so that cells can be selected adequately.

Now, embodiments of the present invention will be described in detail below with reference to the accompanying drawings. Note that the radio communication methods according to individual embodiments may be applied individually or may be applied in combination.

Note that each beam in the present specification is identified based on, but not limited to, at least one of following (1) to (9): (1) the resource (for example, the time and/or frequency resource), (2) the SS block (SS block index), (3) the antenna port, (4) precoding (for example, whether or not precoding is applied, the precoding weight, etc.), (5) the transmission power, (6) the phase rotation, (7) the beam width, (8) the beam angle (for example, the tilt angle); and (9) the number of layers.

Also, the term "beam" used in the present specification may be used interchangeably with at least one of above (1) to (9), and, for example, "beam" may be read as "resource," "antenna port" and so on.

First Embodiment

The first embodiment relates to a user terminal that obtains a cell-level measurement result by using measurement results pertaining to one or more beams before layer 1 filtering is applied. FIG. 3A shows a measurement model in a user terminal according to the first embodiment.

Before layer 1 filtering, a cell-level conversion section 51 is provided, which serves as a measurement section for converting beam-level measurement results into a cell-level measurement result. Also, an L1 filter 21, which applies layer 1 filtering to beam-level measurement results matching the number of beams (beam indices 1 to X), and one cell-level measurement result, an L3 filer 31, which applies L3 filtering to the measurement results after layer 1 filtering, and an evaluation section 41, which evaluates whether the beam-level measurement results and the cell-level measurement result after layer 3 filtering satisfy the reporting standard, are provided, As shown in FIG. 2, in each of sweeping periods 1 to Y, the base station sweeps and transmits DL beam-specific MRSs while changing the beams. In above-noted case 2 or case 3, in which individual beams can be identified, the user terminal measures each DL beam-specific MRS, using resources that correspond to each of beams 1 to X, in each of sweeping periods 1 to Y. The beam-level measurement results ($ResB_{1,1}$ ... $ResB_{1,X}$ to $ResB_{Y,1}$ ... $ResB_{Y,X}$), which are the measurement results (for example, the RSRPs) of the DL beam-specific MRSs, are input to the cell-level conversion section 51 and the L1 filter 21, sequentially.

According to the first embodiment, in the cell-level conversion section 51, the beam-level measurement results ($ResB_{1,1}$ ... $ResB_{1,X}$ to $ResB_{Y,1}$ ... $ResB_{Y,X}$) are converted into cell-level measurement results ($ResC_1$ to $ResC_Y$). The cell-level measurement results ($ResC_1$ to $ResC_Y$) that are converted before layer 1 filtering are input to the L1 filter 21.

The L1 filter 21 applies layer 1 filtering to the cell-level measurement results ($ResC_1$ to $ResC_Y$), and also applies layer 1 filtering to the beam-level measurement results ($ResB_{1,1}$ ... $ResB_{1,X}$ to $ResB_{Y,1}$ ... $ResB_{Y,X}$). The L1 filter 21 obtains a cell-level measurement result (ResC_L1) by, which applies layer 1 filtering to the cell-level measurement results ($ResC_1$ to $ResC_Y$).

The L3 filter 31 applies layer 3 filtering to cell-level measurement result ResC_L1 after layer 1 filtering, and also applies layer 3 filtering to the beam-level measurement results after layer 1 filtering.

The evaluation section 41 evaluates whether the cell-level measurement result after layer 3 filtering and the beam-level measurement results after layer 3 filtering, put together, satisfy the reporting standard. If the reporting standard is met, the cell-level measurement result is reported in idle mode, and at least one of the cell-level measurement result and the beam-level measurement results is reported in connected mode.

Note that, although, in the measurement model shown in FIG. 3A, the evaluation section 41 puts together and evaluates the cell-level measurement result and the beam-level measurement results, as shown in FIG. 3B, it is equally possible to individually provide an evaluation section that evaluates the cell-level measurement result and an evaluation section that evaluates the beam-level measurement results, and make the cell-level and beam-level evaluations separately.

According to the first embodiment, beam-level measurement results are converted into a cell-level measurement result in the cell-level conversion section 51, so that it is possible to report cell-level measurement results and select cells adequately.

Second Embodiment

Figure 4:
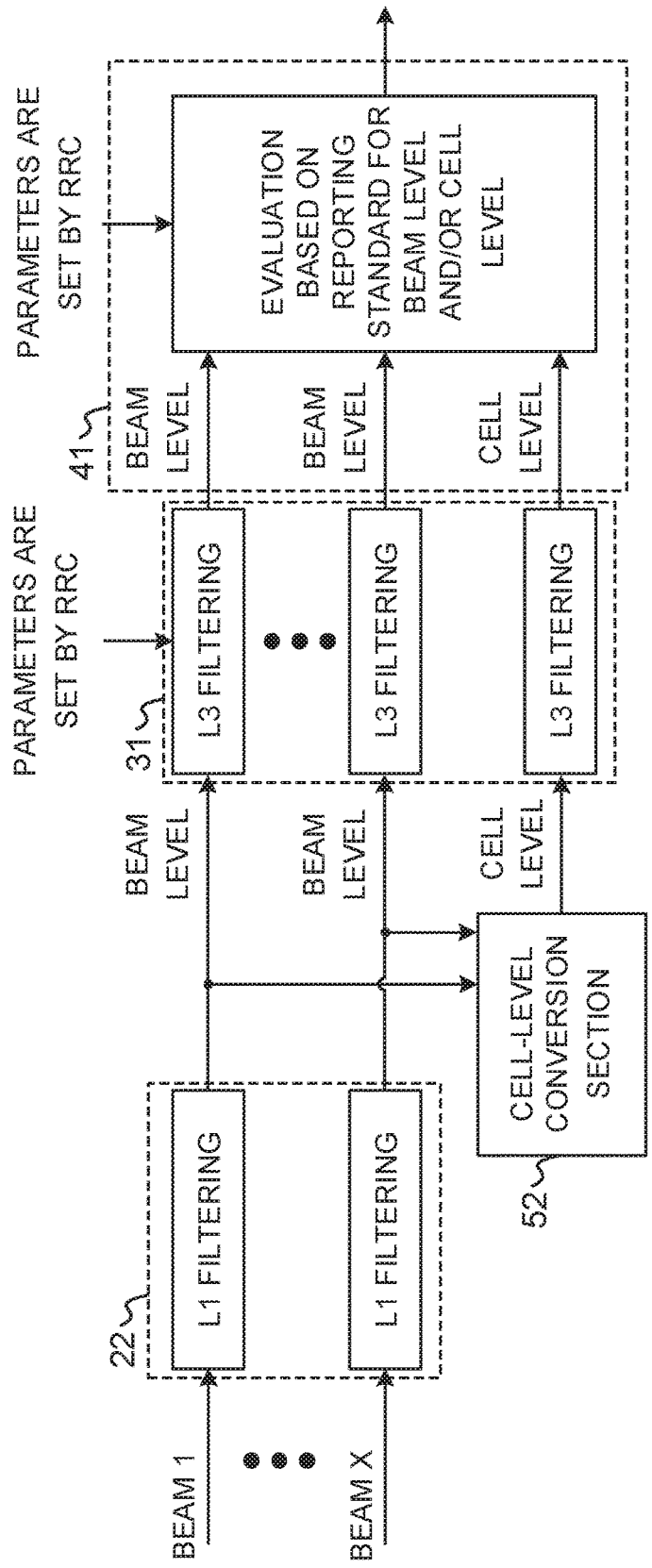
FIG. 4 is a diagram to show a measurement model in a user terminal according to a second embodiment.

A second embodiment relates to a user terminal that obtains a cell-level measurement result using measurement results pertaining to one or more beams after layer 1 filtering is applied and before layer 3 filtering is applied. FIG. 4 shows a measurement model in a user terminal according to the second embodiment.

A cell-level conversion section 52 is provided, which serves as a measurement section that converts beam-level measurement results into a cell-level measurement result after layer 1 filtering and before layer 3 filtering is applied. Also, an L1 filter 22, which applies layer 1 filtering to beam-level measurement results matching the number of beams (beam indices 1 to X), an L3 filter 31, which applies layer 3 filtering to the cell-level measurement result and the beam-level measurement results after layer 1 filtering, and an evaluation section 41, which evaluates whether the beam-level measurement results and the cell-level measurement result after layer 3 filtering satisfy the reporting standard.

As has been shown with FIG. 2, in each of sweeping periods 1 to Y, the base station sweeps and transmits DL beam-specific MRSs while changing the beams. In above-noted case 2 or case 3, in which individual beams can be identified, the user terminal measures each DL beam-specific MRS, using resources that correspond to each of beams 1 to X, in each of sweeping periods 1 to Y. The beam-level measurement results ($ResB_{1,1}$ ... $ResB_{1,X}$ to $ResB_{Y,1}$ ... $ResB_{Y,X}$), which are the measurement results (for example, the RSRPs) of the DL beam-specific MRSs, are input to the L1 filter 22, sequentially, The L1 filter 22 applies layer 1 filtering to the beam-level measurement results ($ResB_{1,1}$ ... $ResB_{1,X}$ to $ResB_{Y,1}$ ... $ResB_{Y,X}$). The beam-level measurement results after layer 1 filtering ($ResB\_L1_{all,1}$ ... $ResB\_L1_{all,X}$) are input to the cell-level conversion section 52 and the L3 filter 31.

In the second embodiment, the beam-level measurement results ($ResB\_L1_{all,1}$ ... $ResB\_L1_{all,X}$) after layer 1 filtering are converted into a cell-level measurement result (ResC) in the cell-level conversion section 52. The cell-level measurement result (ResC), converted in the cell-level conversion section 52, is input to the L3 filter 31 in the subsequent stage.

The L3 filter 31 applies layer 3 filtering to cell-level measurement result ResC after layer 1 filtering, and also applies layer 3 filtering to the beam-level measurement results after layer 1 filtering.

As in the first embodiment, the evaluation section 41 evaluates whether the cell-level measurement result after layer 3 filtering and the beam-level measurement results after layer 3 filtering, put together, satisfy the reporting standard. Note that the evaluation section 41 may make the cell-level and beam-level evaluations separately, as shown in FIG. 3B.

According to the second embodiment, beam-level measurement results are converted into a cell-level measurement result in the cell-level conversion section 52, so that it is possible to report cell-level measurement results and select cells adequately.

Third Embodiment

Figure 5:
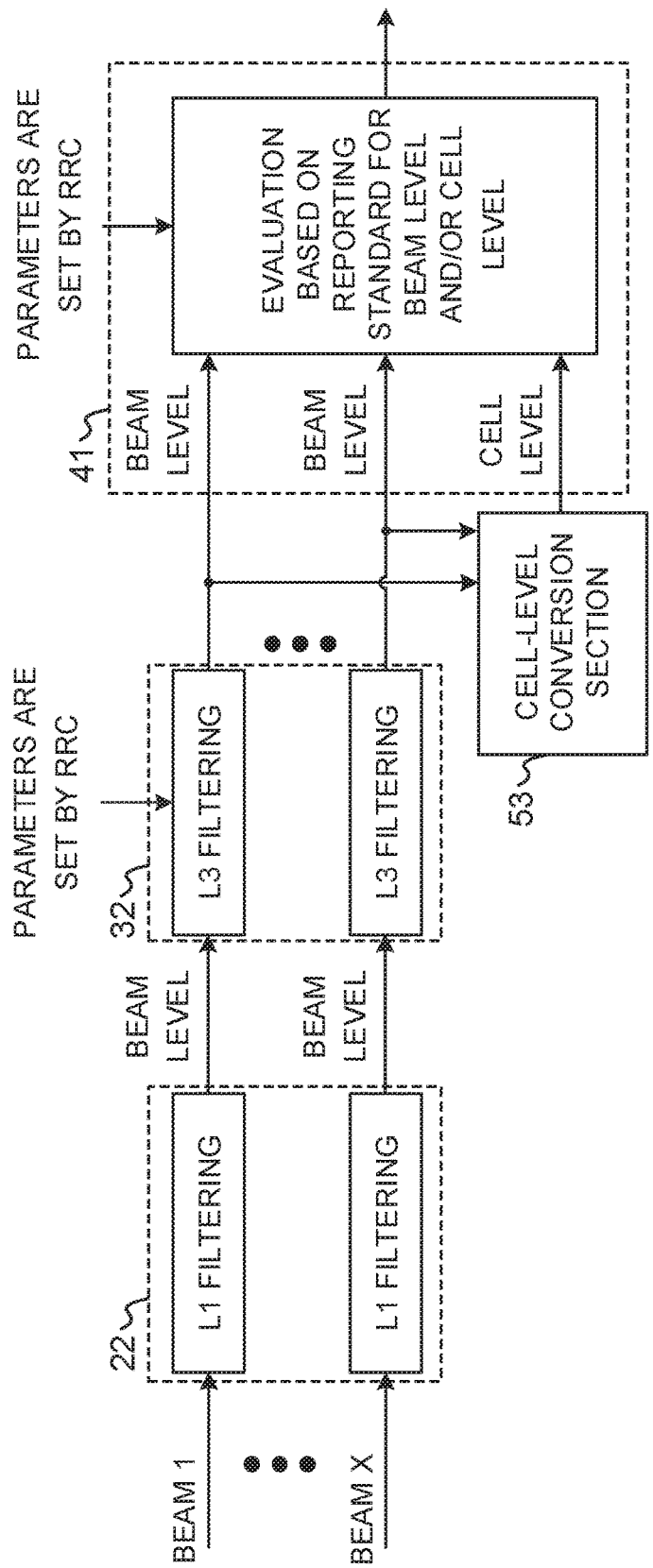
FIG. 5 is a diagram to show a measurement model in a user terminal according to a third embodiment.

A third embodiment relates to a user terminal that acquires a cell-level measurement results using measurement results pertaining to one or more beams after layer 3 filtering is applied. FIG. 5 shows a measurement model in a user terminal according to the third embodiment.

After layer 3 filtering, a cell-level conversion section 53 is provided, which serves as a measurement section that converts beam-level measurement results into a cell-level measurement result. Also, an L1 filter 22, which applies layer 1 filtering to beam-level measurement results matching the number of beams (beam index 1 to X), an L3 filter 32, which applies layer 3 filtering to the beam-level measurement results after layer 1 filtering, and an evaluation section 41, which evaluates whether the beam-level measurement results after layer 3 filtering and the cell-level measurement result satisfy the reporting standard, are provided.

As has been shown with FIG. 2, in each of sweeping periods 1 to Y, the base station sweeps and transmits DL beam-specific MRSs while changing the beams. In above-noted case 2 or case 3, in which individual beams can be identified, the user terminal measures each DL beam-specific MRS, using resources that correspond to each of beams 1 to X, in each of sweeping periods 1 to Y. The beam-level measurement results ($ResB_{1,1}$ ... $ResB_{1,X}$ to $ResB_{Y,1}$ ...

$ResB_{Y,X}$), which are the measurement results (for example, the RSRPs) of the DL beam-specific MRSs, are input to the L1 filter 22, sequentially.

The L1 filter 22 applies layer 1 filtering to the beam-level measurement results ($ResB_{1,1}$ ... $ResB_{1,X}$ to $ResB_{Y,1}$ ... $ResB_{Y,X}$). The beam-level measurement results ($ResB\_L1_{all,1}$ ... $ResB\_L1_{all,X}$) after layer 1 filtering are input to the L3 filter 32.

The L3 filter 32 applies layer 3 filtering to the beam-level measurement results after layer 1 filtering. The L3 filter 32 inputs the beam-level measurement results ($ResB\_L3_{all,1}$ ... $ResB\_L3_{all,X}$) after layer 3 filtering into the cell-level conversion section 53 and the evaluation section 41.

In the third embodiment, the beam-level measurement results ($ResB\_L3_{all,1}$ ... $ResB\_L3_{all,X}$) after layer 3 filtering are input to the cell-level conversion section 53, converted into a cell-level measurement result ResC, and then input to the evaluation section 41.

As in the first embodiment, the evaluation section 41 evaluates whether the cell-level measurement result after layer 3 filtering and the beam-level measurement results after layer 3 filtering, put together, satisfy the reporting standard. Note that the evaluation section 41 may make the cell-level and beam-level evaluations separately, as shown in FIG. 3B.

According to the third embodiment, beam-level measurement results are converted into a cell-level measurement result in the cell-level conversion section 53, so that it is possible to report cell-level measurement results and select cells adequately.

Fourth Embodiment

Figure 6:
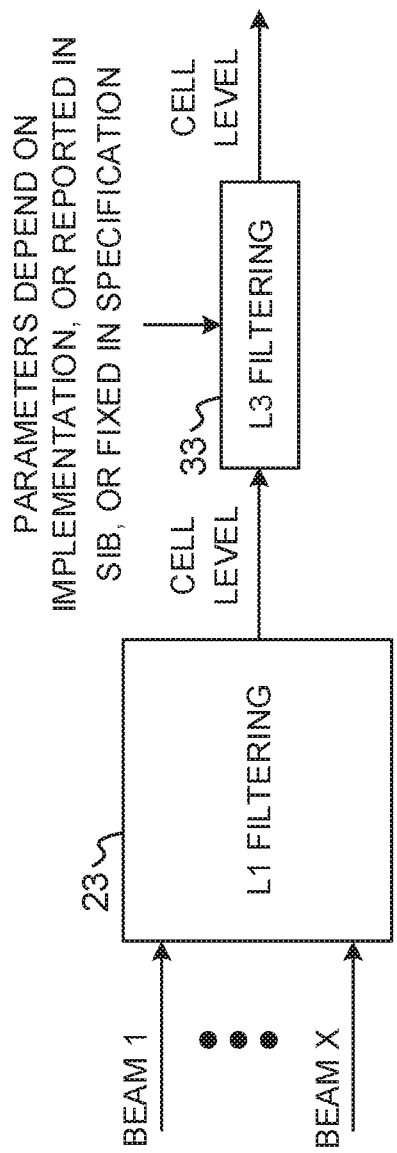
FIG. 6 is a diagram to show a measurement model in a user terminal according to a fourth embodiment.

A fourth embodiment relates to a user terminal that obtains a cell-level measurement result by using measurement results pertaining to one or more beams that are obtained based on signals (for example, MRSs) detected during a period. FIG. 6 shows a measurement model in a user terminal according to the fourth embodiment.

A user terminal, according to the fourth embodiment, supports above-described case 1, in which beams cannot be identified. In an L1 filter 23 where layer 1 filtering takes place, the user terminal converts measurement results of signals that have been successfully detected without identifying the beams, into a cell-level measurement result. The converted cell-level measurement result is input to the L3 filter 33 where layer 3 filtering takes place.

The L3 filter 33 applies layer 3 filtering to the cell-level measurement result. The parameters to be applied to layer 3 filtering may depend on the mode of implementation, or may be reported in SIBs. Furthermore, parameters stipulated in the standard may be configured.

Next, a conversion method that is applicable to the cell-level conversion sections 51, 52, and 53 that convert beam-level measurement results into a cell-level measurement result according to the first embodiment to the third embodiment will be described.

As shown in FIG. 2, in each of sweeping periods 1 to Y, the base station sweeps and transmits the DL beam-specific MRS while changing the beam. In each of sweeping periods 1 to Y, the user terminal measures DL beam-specific MRSs (beam-level measurement results: $ResB_{1,1}$ ... $ResB_{1,X}$ to $ResB_{Y,1}$ ... $ResB_{Y,X}$) using resources that correspond to each beam (beam index 1 to X). Although the user terminal receives X beams in one sweeping period, the user terminal selects N beams out of X beams. N is a numerical value that is equal to or larger than 1, and is a numerical value not exceeding X.

The user terminal may select beams according to the following rules:

Rule 1: Top N good-quality beams are selected from the detected beams;

Rule 2: Beams whose beam quality (for example RSRP) exceeds a threshold value are selected;

Rule 3: Beams whose beam quality is within a predetermined value are selected based on the beam of the best quality beam (for example RSRP); and Rule 4: The above rules are combined arbitrarily. For example, the combination of rule 1 and rule 2, the combination of rule 1 and rule 3, the combination of rule 2 and rule 3 and all combinations of rule 1 to rule 3 are possible.

The beam-level measurement results of, for example, N beams, selected based on the above rules, are converted into a cell-level measurement result. As for the method of conversion into a cell-level measurement result, the averaging method, the weighting method and so on can be used. In the averaging method, for example, the average value of N beam-level measurement results corresponding to N selected beams is determined and used as the cell-level measurement result. The weighting method is a method of weighting and summing N beam-level measurement results corresponding to N selected beams, for example. The averaging method and the weighting method are simply examples, and other methods may be applied.

The following method may be conceivable as a method of allowing a user terminal in idle mode to recognize the parameters related to the above conversion method. For example, signaling may be made unnecessary by stipulating part of the parameters in advance in the standard, while other parameters are reported to the user terminal in SIBs.

The following method may be conceivable as a method of allowing a user terminal in connected mode to recognize the parameters related to the above conversion method. For example, the required parameters may be included in measurement configuration information and reported to the user terminal via RRC signaling.

Next, examples of the details of processes from the first embodiment to the fourth embodiment will be described in greater detail.

Figure 7:
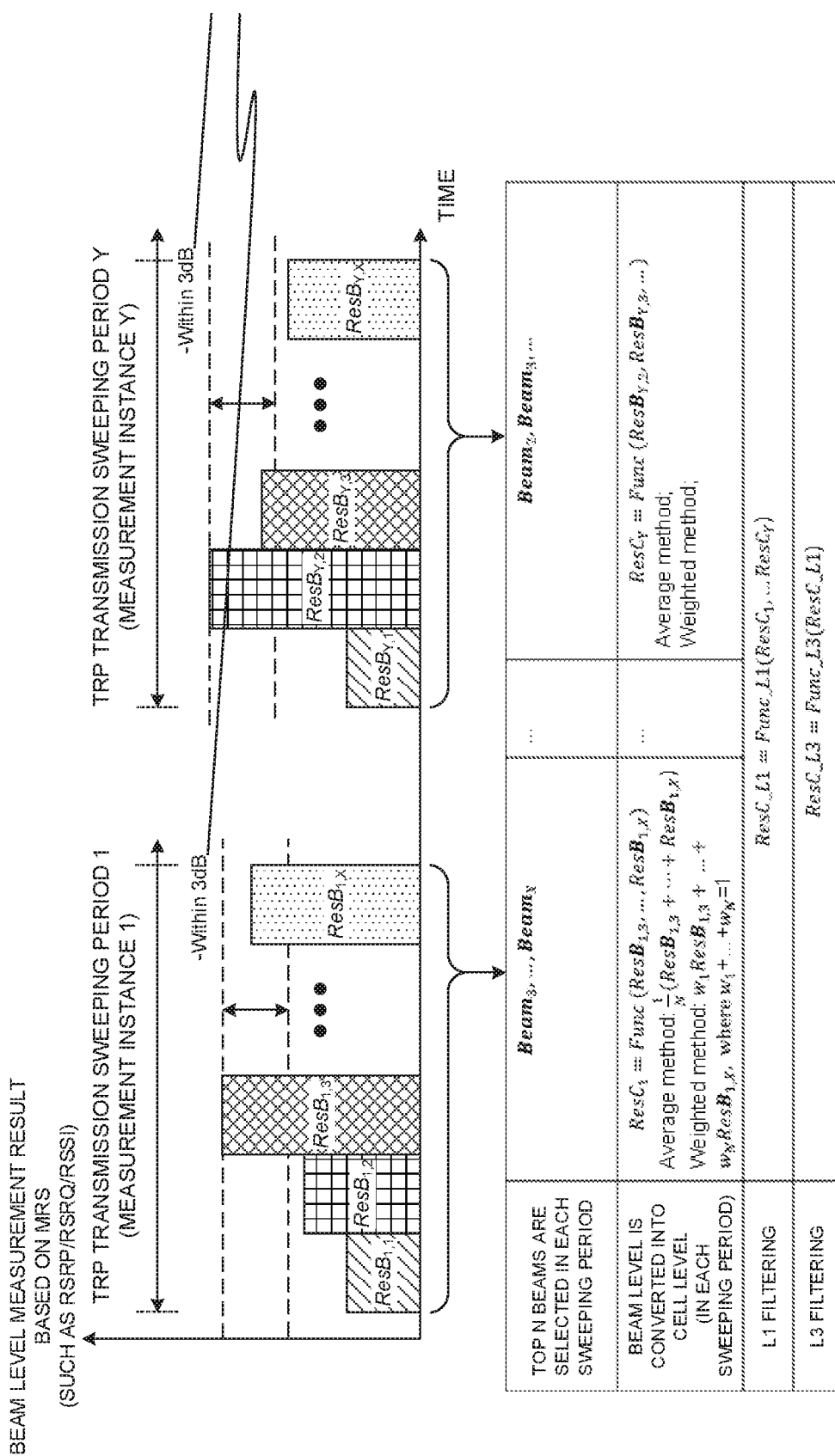
FIG. 7 is a diagram to show the details of specific operations in a user terminal according to the first embodiment.

FIG. 7 shows specific details of the processes according to the first embodiment. The following description will be given based on the assumption that the multi-beam transmission exemplified in FIG. 2 takes place. In each of sweeping periods 1 to Y, a user terminal measures DL beam-specific MRSs using resources that correspond to each beam (beam index 1 to X), and obtains beam-level measurement results ($ResB_{1,1}$ ... $ResB_{1,X}$ to $ResB_{Y,1}$ ... $ResB_{Y,X}$).

The user terminal selects N beam-level measurement results out of the beam-level measurement results ($ResB_{1,1}$ ... $ResB_{1,X}$) obtained in sweeping period 1. For example, the user terminal selects N beam-level measurement results, whose beam quality is within a predetermined value (3 dB), with reference to the beam-level measurement result of the best quality ($ResB_{1,3}$) among the X beam-level measurement values (Rule 1+Rule 3). In the other sweeping periods (measurement instance index 2 to Y), too, the user terminal selects N beam-level measurement results, following the same rules as those described above.

Next, for each sweeping period (measurement instance index 1 to Y), the N selected beam-level measurement results are converted into the cell-level measurement result of each sweeping period (1 to Y), by using the averaging method or the weighting method. For example, when the averaging method is applied, the N beam-level measurement results ($ResB_{1,3} \ldots ResB_{1,X}$) selected in sweeping period 1 are added up, and the sum value is divided by N, which gives cell-level measurement result $ResC_1$ for sweeping period 1. In the other sweeping periods (measurement instance index 2 to Y), too, cell-level measurement results $ResC_2$ to $ResC_Y$ are obtained likewise.

Next, layer 1 filtering is applied to cell-level measurement results $ResC_2$ to $ResC_Y$ to obtain cell-level measurement result ResC_L1. Layer 3 filtering is further applied to cell-level measurement result ResC_L1 after layer 1 filtering, to obtain cell-level measurement result ResC_L3. Cell-level measurement result ResC_L3 after layer 3 filtering is input to the evaluation section 41.

Figure 8:
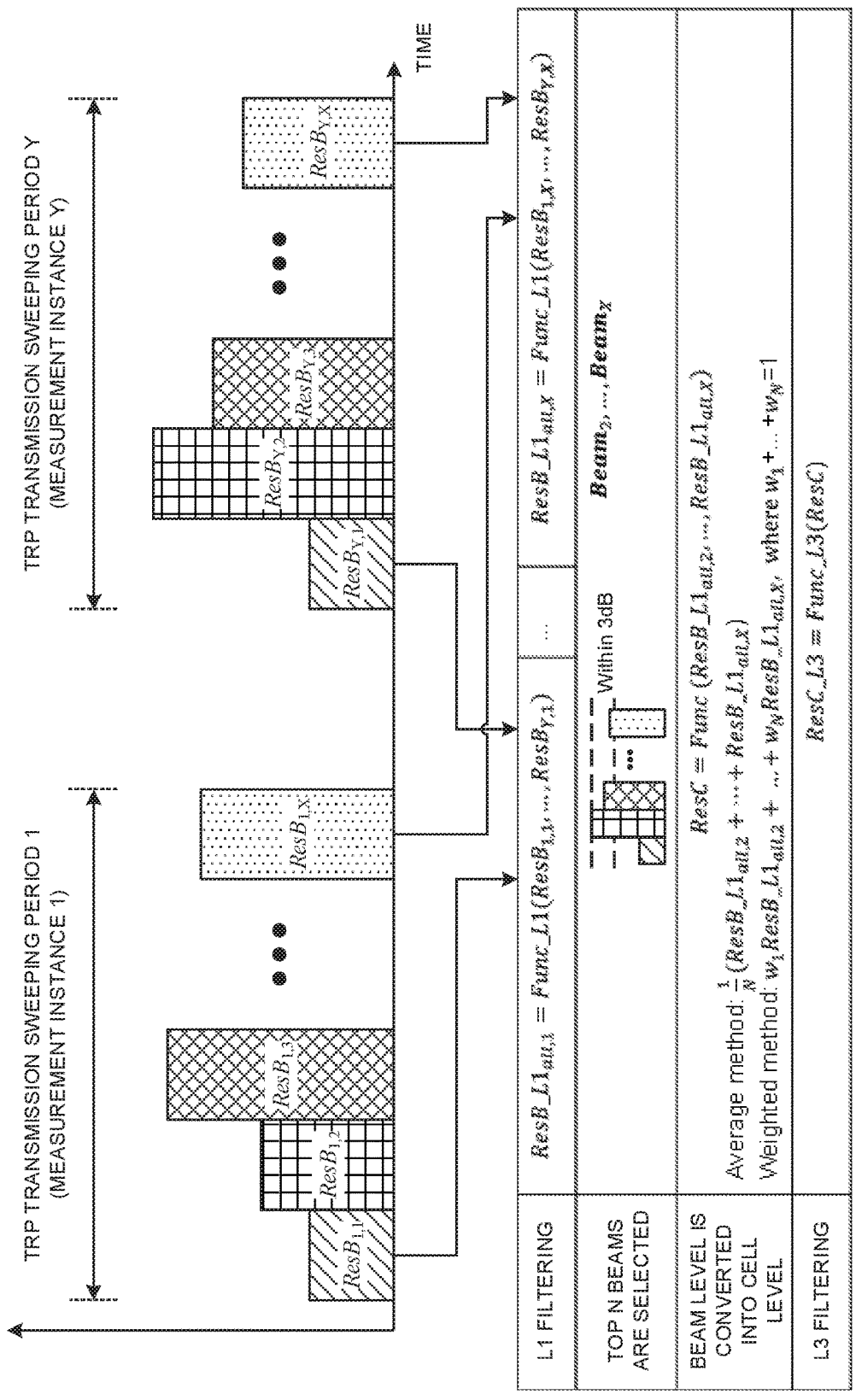
FIG. 8 is a diagram to show the details of specific operations in a user terminal according to the second embodiment.

FIG. 8 shows specific details of the processes according to the second embodiment. The following description will be given based on the assumption that the multi-beam transmission exemplified in FIG. 2 takes place. In each of sweeping periods 1 to Y, a user terminal measures DL beam-specific MRSs using resources that correspond to each beam (beam index 1 to X), and obtains beam-level measurement results ($ResB_{1,1} \ldots ResB_{1,X}$ to $ResB_{Y,1} \ldots ResB_{Y,X}$).

In layer 1 filtering, the user terminal extracts beam-level measurement results with the same beam index from the beam-level measurement results of each sweeping period (measurement instance index 1 to Y), and applies layer 1 filtering to them. For example, the user terminal extracts the beam-level measurement results ($ResB_{1,1} \ldots ResB_{Y,1}$) corresponding to beam index 1 from sweeping periods 1 to Y, finds their average through layer 1 filtering, and obtains beam-level measurement result $ResB\_L1_{all,1}$ corresponding to beam index 1. Layer 1 filtering is similarly applied to the other beam indices. In this manner, beam-level measurement results ($ResB\_L1_{all,1}$ to $ResB\_L1_{all,X}$) are obtained on a per beam index basis.

Next, N measurement results are selected out of X beam-level measurement results $ResB\_L1_{all,1}$ to $ResB\_L1_{all,X}$, corresponding to beam index 1 to beam index X. For example, among X beam-level measurement values, N beam-level measurement results (Rule 1+Rule 3), whose beam quality is within a predetermined value (3 dB) with reference to the beam-level measurement result ($ResB\_L1_{all,2}$) of the highest quality, are selected. In the example shown in FIG. 8, the quality of beam 2 (beam index 2) is the highest, and beam 3, beam X and so on are present within 3 dB from the quality of beam 2 (beam index 2).

Next, the N selected beam-level measurement results are converted into one cell-level measurement result ResC using the averaging method or the weighting method. For example, when the averaging method is applied, the N beam-level measurement results ($ResB\_L1_{all,2}$, $ResB\_L1_{all,3}$, ... $ResB\_L1_{all,X}$) are added up, and the sum value is divided by N, which gives cell-level measurement result ResC.

Next, layer 3 filtering is applied to cell-level measurement result ResC, and cell-level measurement result ResC_L3 is obtained. Cell-level measurement result ResC_L3 after layer 3 filtering is input to the evaluation section 41.

Figure 9:
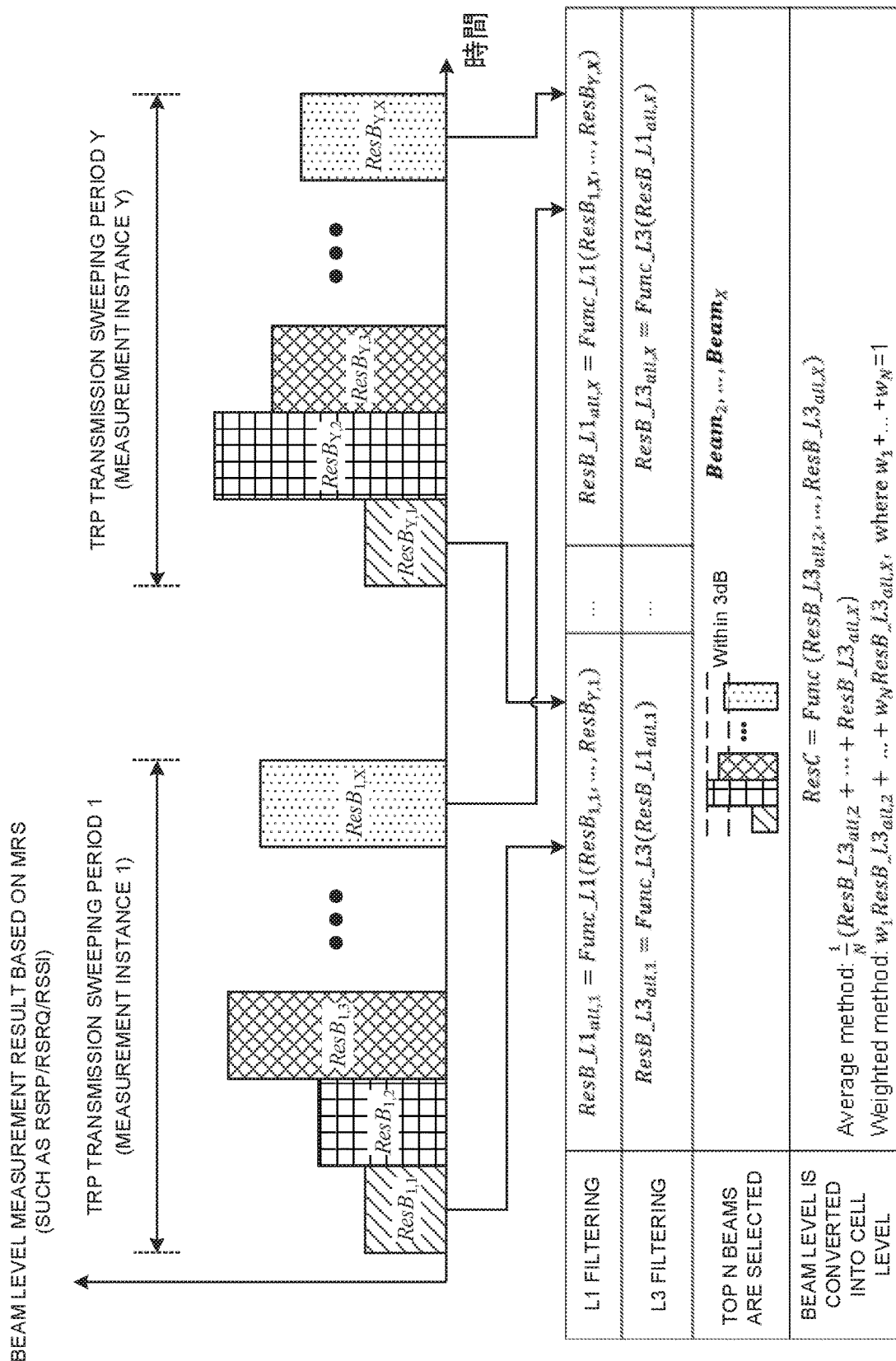
FIG. 9 is a diagram to show the details of specific operations in a user terminal according to the third embodiment.

FIG. 9 shows specific details of the processes according to the third embodiment. The following description will be given based on the assumption that the multi-beam transmission exemplified in FIG. 2 takes place. In each of sweeping periods 1 to Y, a user terminal measures DL beam-specific MRSs using resources that correspond to each beam (beam index 1 to X), and obtains beam-level measurement results ($ResB_{1,1} \ldots ResB_{1,X}$ to $ResB_{Y,1} \ldots ResB_{Y,X}$).

The user terminal extracts beam-level measurement results with the same beam index from the beam-level measurement results of each sweeping period 1 to Y, and applies layer 1 filtering to them. For example, the user terminal extracts the beam-level measurement results ($ResB_{1,1} \ldots ResB_{Y,1}$) corresponding to beam index 1 from sweeping periods 1 to Y, finds their average through layer 1 filtering, and obtains beam-level measurement result $ResB\_L1_{all,1}$. Layer 1 filtering is similarly applied to the other beam indices. In this manner, beam-level measurement results ($ResB\_L1_{all,1}$ to $ResB\_L1_{all,X}$) are obtained on a per beam index basis.

Next, layer 3 filtering is applied to the beam-level measurement result of each beam index ($ResB\_L1_{all,1}$ to $ResB\_L1_{all,X}$), and beam-level measurement results after layer 3 filtering ($ResB\_L3_{all,1}$ to $ResB\_L3_{all,X}$) are obtained.

Next, N measurement results are selected out of X beam-level measurement results $ResB\_L3_{all,1}$ to $ResB\_L3_{all,X}$, corresponding to beam index 1 to beam index X. For example, among X beam-level measurement values, N beam-level measurement results (Rule 1+Rule 3), whose beam quality is within a predetermined value (3 dB) with reference to the beam-level measurement result ($ResB\_L3_{all,2}$) of the highest quality, are selected. In the example shown in FIG. 9, the quality of beam 2 (beam index 2) is the highest, and beam 3, beam X and so on are present within 3 dB from the quality of beam 2 (beam index 2).

Next, the N selected beam-level measurement results are converted into one cell-level measurement result ResC using the averaging method or the weighting method. For example, when the averaging method is applied, the N beam-level measurement results ($ResB\_L1_{all,2}$, $ResB\_L1_{all,3}$, ... $ResB\_L1_{all,X}$) are added up, and the sum value is divided by N, which gives cell-level measurement result ResC. Cell-level measurement result ResC is input to the evaluation section 41.

Figure 10:
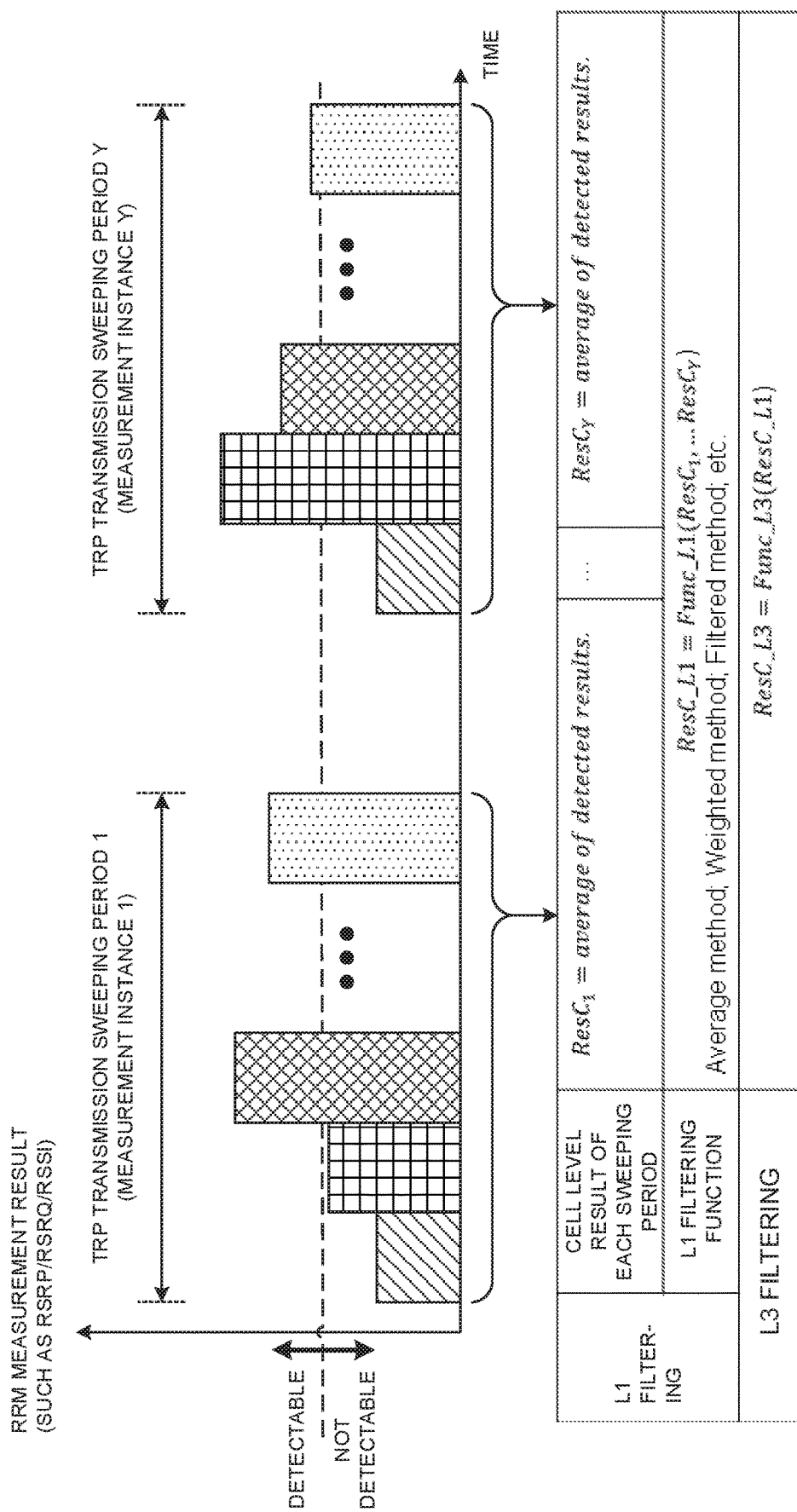
FIG. 10 is a diagram to show the details of specific operations in a user terminal according to the fourth embodiment.

FIG. 10 shows specific details of the processes according to the fourth embodiment. The following description will be given based on the assumption that the multi-beam transmission exemplified in FIG. 2 takes place. Since a user terminal is unable to identify individual beams that are transmitted in sweeping periods, the user terminal treats the average value of signals that have been successfully detected in each sweeping period as cell-level measurement result ResC, and converts this into a cell-level measurement result through layer 1 filtering.

In the example shown in FIG. 10, in the period corresponding to sweeping period 1, signals are detected in the resources corresponding to beam 3, beam X and so on, and no signal is detected in the resources corresponding to beam 1, beam 2 and so on. The average value of signals that have been successfully detected in sweeping period 1 is used as cell-level measurement result $ResC_1$, and, in the other sweeping periods, similarly, the average values of signals that have been successfully detected in sweeping periods 2 to Y are obtained as cell-level measurement results $ResC_2$ to $ResC_Y$ (step 1).

Furthermore, cell-level measurement results $ResC_1$ to $ResC_Y$ are converted into one cell-representative value, by using the averaging method or the weighting method (step 2). For example, the average of cell-level measurement results $ResC_1$ to $ResC_Y$ is found, and cell-level measurement result ResC_L1 after layer 1 filtering is obtained.

Note that, although, in the example shown in FIG. 10, the measurement instance indices that correspond to respective sweeping periods are incremented from 1 to Y, and the averaging process (or the weighting process) is performed after cell-level measurement results $ResC_1$ to $ResC_Y$ of all sweeping periods are acquired, it is equally possible to apply shortened measurements as well. For example, when Y=1 is set and cell-level measurement result $ResC_1$ of sweeping period 1 is acquired, it is possible to skip step 2, and make a transition to layer 3 filtering.

Next, layer 3 filtering is applied to cell-level measurement result ResC_L1 after layer 1 filtering, and cell-level measurement result ResC_L3 after layer 3 filtering is obtained. Cell-level measurement result ResC_L3 after layer 3 filtering is input to the evaluation section 41.

Next, an example of the method of reporting RRM measurement-related information to user terminals in idle mode/connected mode will be described. In particular, information about the conversion processing for converting beam-level measurement results into cell-level measurement results will be described as RRM measurement-related information.

First, a method of reporting RRM measurement-related information to a user terminal in idle mode will be described. In existing LTE systems, RRM measurement-related information is reported to a user terminal using SIBs. For example, information about cell selection and cell connection is transmitted in SIB 1, and information about cell reselection is transmitted in SIB 3. Also, information about cell reselection with respect to adjoining cells is transmitted in SIB 4, and information about cell reselection between different frequencies is transmitted in SIB 5.

In the multi-beam scenario in 5G or NR, the following information can be added as information about cell selection/reselection.

The information related to cell selection may include resource information for MRS transmission and measurement, conversion-related information that is required in the process of converting beam-level measurement results into cell-level measurement results, and so on.

The MRS resource information may include at least one of the transmission cycle of DL beam-specific MRSs in each sweeping period, the duration of each MRS transmission, the time offset of MRS transmission, the frequency resource or frequency band for MRS measurement, beam-related information for DL beam-specific MRSs, and/or the like.

The conversion-related information may include at least one of (1) the number of beams "N" to be selected in rule 1, (2) the rule itself for selecting N beams and/or the threshold in rule 2, and (3) information about the functions for converting beam-level measurement results into cell-level measurement results (for example, the weighting coefficients for use in the weighting method, and/or the like). The conversion-related information is included in SIBs and reported to the user terminal. Alternatively, part of the conversion-related information may be stipulated in the standard, which makes its signaling unnecessary, and the rest of the information may be included in SIBs and signaled.

Also, in the multi-beam scenario, the following information may be added as information about cell reselection in the same frequency/different frequencies.

The information about cell reselection may include information about the resources for transmitting and measuring MRSs (for example, the frequency band, the period, etc.). For example, a white list or a black list may be used in a supplementary way to represent a number of different parameters in a simplified manner. The white list may indicate cells where multiple beams (or a single beam) are adopted. Alternatively, the white list may indicate cells where the MRS neurology is the same as in the current cell.

Next, the method of reporting RRM measurement-related information to a user terminal in connected mode will be described. A user terminal in connected mode can report RRM measurement-related information from the base station via RRC signaling. In particular, information (beam list) related to the beams in cells employing multi-beam operation should be added as measurement target information to be included in RRM measurement-related information. The beam-related information (beam list) to be added may include at least one of beam IDs, information about the resources for beam-specific MRS measurements, and so on.

(Radio Communication System)

Now, the structure of the radio communication system according to one embodiment of the present invention will be described below. In this radio communication system, communication is performed using one or a combination of the herein-contained embodiments of the present invention.

Figure 11:
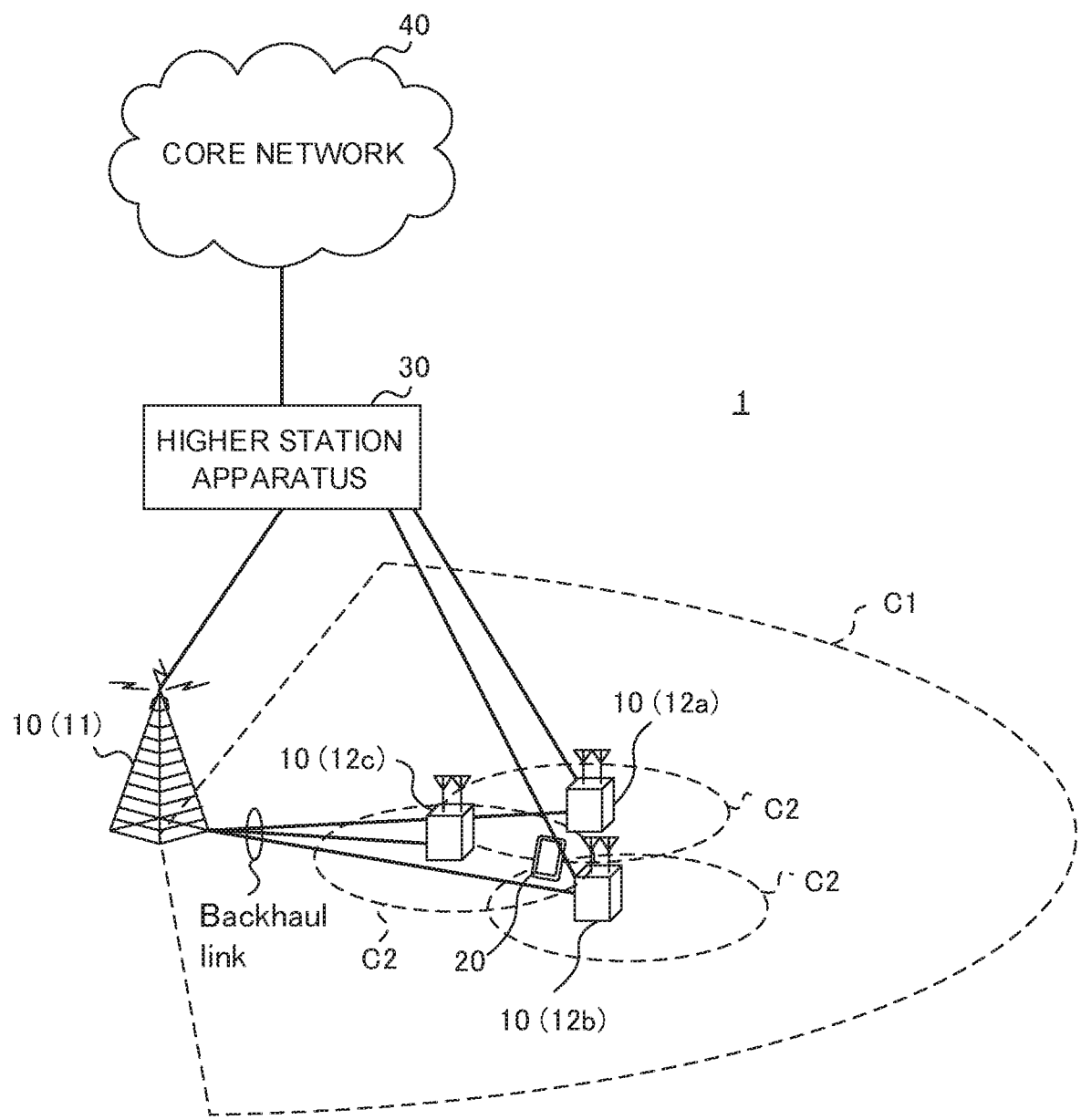
FIG. 11 is a diagram to show an example of a schematic structure of a radio communication system.

FIG. 11 is a diagram to show an example of a schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)", "LTE-A (LTE-Advanced)", "LTE-B (LTE-Beyond)", "SUPER 3G, "IMT-Advanced," "4G (4th generation mobile communication system)", "5G (5th generation mobile communication system)", "FRA (Future Radio Access)", "New-RAT (Radio Access Technology)" and so on, or may be seen as a system to implement these.

The radio communication system 1 includes a radio base station 11 that forms a macro cell C1 having a relatively wide coverage, and radio base stations 12 (12a to 12c) that are placed within the macro cell C1 and that form small cells C2, which are narrower than the macro cell C1. Also, user terminals 20 are placed in the macro cell C1 and in each small cell C2.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations), In the radio communication system 1, as radio access schemes, orthogonal frequency division multiple access (OFDMA) is applied to the downlink, and single-carrier frequency division multiple access (SC-FDMA) is applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to these combinations, and other radio access schemes may be used.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and SIBs (System Information Blocks) are communicated in the PDSCH. Also, the MIB (Master Information Block) is communicated in the PBCH. A shared control channel that reports the presence or absence of a paging channel is mapped to a downlink L1/L2 control channel (for example, PDCCH), and the data of the paging channel (PCH) is mapped to the PDSCH. Downlink reference signals, uplink reference signals and physical downlink synchronization signals are separately arranged.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data and higher layer control information are communicated by the PUSCH. Also, downlink radio quality information (CQI: Channel Quality Indicator), delivery acknowledgement information and so on are communicated by the PUCCH. By means of the PRACH, random access preambles for establishing connections with cells are communicated.

In the radio communication systems 1, the cell-specific reference signal (CRS: Cell-specific Reference Signal), the channel state information reference signal (CSI-RS: Channel State Information-Reference Signal), the demodulation reference signal (DMRS: DeModulation Reference Signal), the positioning reference signal (PRS: Positioning Reference Signal) and so on are communicated as downlink reference signals. Also, in the radio communication system 1, the measurement reference signal (SRS: Sounding Reference Signal), the demodulation reference signal (DMRS) and so on are communicated as uplink reference signals. Note that the DMRS may be referred to as a "user terminal-specific reference signal (UE-specific Reference Signal)." Also, the reference signals to be communicated are by no means limited to these.

(Radio Base Station)

Figure 12:
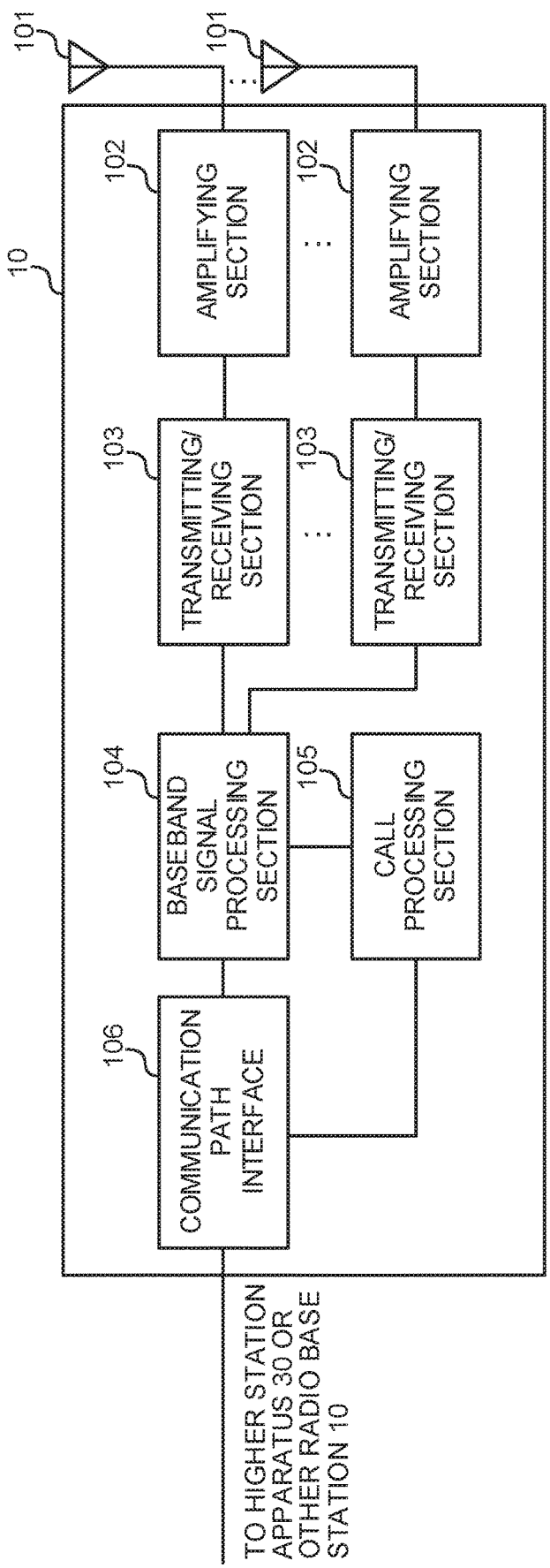
FIG. 12 is a diagram to show an example of an overall structure of a radio base station according to one embodiment of the present invention.

FIG. 12 is a diagram to show an example of an overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a preceding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 include an analog beam forming section that is configured to be able to adopt both multi-beam approach and single-beam approach and which provides analog beam forming. When a DL beam-specific MRS, a synchronization signal and/or a paging channel are transmitted in the multi-beam approach, beam sweeping is applied, in which the beam is changed every unit of one symbol or a plurality of consecutive symbols (sweeping). The beam forming section can be constituted by a beam forming circuit (for example, a phase shifter, a phase shifting circuit, etc.) or beam forming apparatus (for example, a phase shifting device) that can be described based on general understanding of the technical field to which the present invention pertains. Furthermore, the transmitting/receiving antennas 101 may be constituted by, for example, array antennas.

The transmitting/receiving section 103 transmits DL beam-specific MRSs, synchronization signals, broadcast channels, system information (SIBs) and so on.

Figure 13:
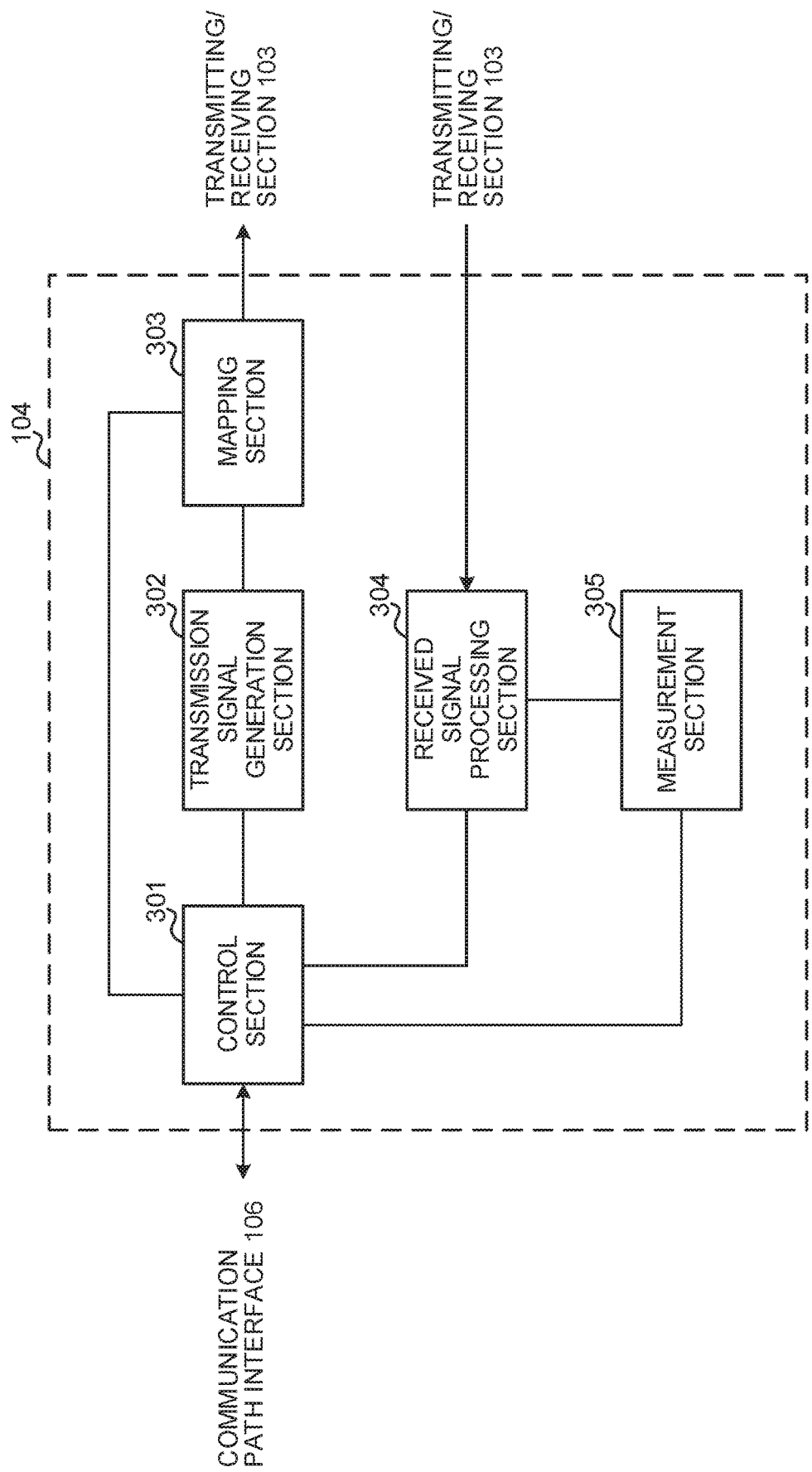
FIG. 13 is a diagram to show an example of a functional structure of a radio base station according to one embodiment of the present invention.

FIG. 13 is a diagram to show an example of a functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104. The baseband signal processing section 104 has digital beam forming functions for providing digital beam forming.

The control section (scheduler) 301 controls the whole of the radio base station 10. The control section 301 can be constituted by a controller, a control circuit or control apparatus that can be described based on general understanding of the technical field to which the present invention pertains.

The control section 301 controls, for example, the generation of signals by the transmission signal generation section 302 (including signals corresponding to DL beam-specific MRSs, synchronization signals, MIB, paging channel, broadcast channel, etc.), the allocation of signals by the mapping section 303 and so on. Furthermore, the control section 301 controls the signal receiving processes in the received signal processing section 304, the measurements of signals in the measurement section 305, and so on.

The control section 301 controls scheduling of system information (SIBs, the MIB, etc.), downlink data signals that are transmitted in the PDSCH (including the passing message PCH), and downlink control signals that are transmitted in the PDCCH and/or the EPDCCH (covering, for example, resource allocation, the shared control channel to report the presence or absence of paging messages, the signal to reporting the multi-beam approach or the single-beam approach, and so on).

The control section 301 controls the scheduling of synchronization signals (for example, PSS/SSS and/or the like) and downlink reference signals such as CRSs, CSI-RSs, DMRSs and MRSs. The control section 301 schedules the RRM measurement-related information to be reported to user terminals in idle mode.

In the multi-beam scenario, the following information can be added as information about cell selection/reselection. The information related to cell selection may include resource information for MRS transmission and measurement, conversion-related information that is required in the process of converting beam-level measurement results into cell-level measurement results, and so on.

The MRS resource information may include at least one of the transmission cycle of DL beam-specific MRSs in each sweeping period, the duration of each MRS transmission, the time offset of MRS transmission, the frequency resource or frequency band for MRS measurement, beam-related information for DL beam-specific MRSs, and/or the like.

The conversion-related information may include at least one of (1) the number of beams "N" to be selected in rule 1, (2) the rule itself for selecting N beams and/or the threshold in rule 2, and (3) information about the functions for converting beam-level measurement results into cell-level measurement results (for example, the weighting coefficients for use in the weighting method, and/or the like). The conversion-related information is included in SIBs and reported to the user terminal. Alternatively, part of the conversion-related information may be stipulated in the standard, which makes its signaling unnecessary, and the rest of the information may be included in SIBs and signaled.

Also, in the multi-beam scenario, the control section 401 may add the following information as information about cell reselection in the same frequency/different frequencies. The information about cell reselection may include information about the resources for transmitting and measuring MRSs (for example, the frequency band, the period, etc.). A white list or a black list may be used in a supplementary way to represent a number of different parameters in a simplified manner. The white list may indicate cells where multiple beams (or a single beam) are adopted. Alternatively, the white list may indicate cells where the MRS neurology is the same as in the current cell.

Also, the control section 401 also schedules the RRM measurement-related information for user terminals in connected mode. RRM measurement-related information is reported from the base station to a user terminal in connected mode via RRC signaling. In particular, information (beam list) related to the beams in cells employing multi-beam operation should be added as measurement target information to be included in RRM measurement-related information. The beam-related information (beam list) to be added may include at least one of beam IDs, information about the resources for beam-specific MRS measurements, and so on.

In addition, the control section 301 controls the scheduling of uplink data signals that are transmitted in the PUSCH, uplink control signals that are transmitted in the PUCCH and/or the PUSCH (for example, delivery acknowledgment information), random access preambles that are transmitted in the PRACH, uplink reference signals, and so on.

The control section 301 may exert control so that transmitting beams and/or receiving beams are formed using the digital beam forming (for example, preceding) by the baseband signal processing section 104 and/or the analog beam forming (for example, phase rotation) by the transmitting/receiving sections 103.

For example, if the multi-beam approach is applied, the control section 301 may exert control so that, in subframes (sweeping periods) where a DL beam-specific MRS, a synchronization signal, a broadcast channel and/or a paging channel is included, each symbol is applied different beam forming, and transmitted while being swept (see FIG. 2).

The control section 301 controls the multi-beam transmission of DL beam-specific MRSs, and receives cell-level measurement results and/or beam-level measurement results from user terminals in idle mode or connected mode. Cell selection or cell reselection based on the cell-level measurement results and/or the beam-level measurement results.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink signal allocation information, and UL grants, which report uplink signal allocation information, based on commands from the control section 301. Also, the downlink data signals are subjected to the coding process, the modulation process and so on, by using coding rates and modulation schemes that are determined based on, for example, channel state information (CSI) from each user terminal 20. Also, based on commands from the control section 301, the transmission signal generation section 302 generates a signal to report the multi-beam approach or the single-beam approach, in the shared control channel where the MIB or system information that is equivalent to the MIB is included.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains. For example, synchronization signals and broadcast channels are mapped to the same symbol indices in different subframes (first example).

The received signal processing section 304 performs receiving processes (for example, demapping, demodulation, decoding and so on) of received signals that are input from the transmitting/receiving sections 103. Here, the received signals are, for example, uplink signals transmitted from the user terminals 20 (including cell-level measurement results, beam-level measurement results, uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when cell-level measurement results and/or beam-level measurement results are received, the received signal processing section 304 outputs these to the control section 301. For example, when a PUCCH to contain an HARQ-ACK is received, the received signal processing section 304 outputs this HARQ-ACK to the control section 301. Also, the received signal processing section 304 outputs the received signals, the signals after the receiving processes and so on, to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

When signals are received, the measurement section 305 may measure, for example, the received power (for example, RSRP (Reference Signal Received Power)), the received quality (for example, RSRQ (Reference Signal Received Quality)), SINR (Signal to Interference plus Noise Ratio) and/or the like), channel states and so on. The measurement results may be output to the control section 301.

(User Terminal)

Figure 14:
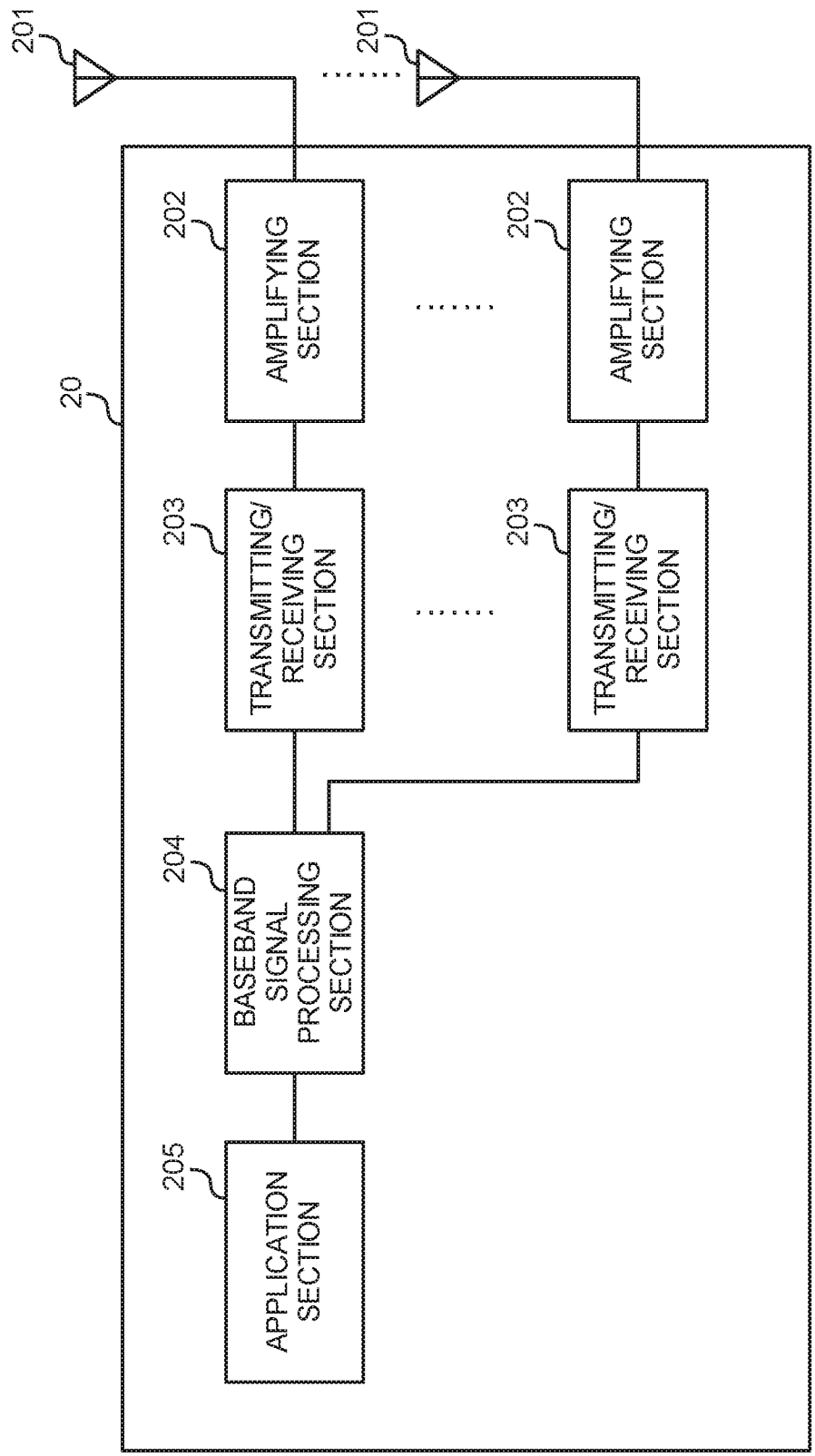
FIG. 14 is a diagram to show an example of an overall structure of a user terminal according to one embodiment of the present invention.

FIG. 14 is a diagram to show an example of an overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARM transmission process), channel coding, preceding, a discrete Fourier transform (DFT) process, an IFFT process and so on, and the result is forwarded to the transmitting/receiving section 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 may furthermore have an analog beam forming section that forms analog beams. The analog beam forming section may be constituted by an analog beam forming circuit (for example, a phase shifter, a phase shifting circuit, etc.) or analog beam forming apparatus (for example, a phase shifting device) that can be described based on general understanding of the technical field to which the present invention pertains. Furthermore, the transmitting/receiving antennas 201 may be constituted by, for example, array antennas.

The transmitting/receiving sections 203 receive DL beam-specific MRSs, synchronization signals, broadcast channels, system information (SIBs) and so on.

Figure 15:
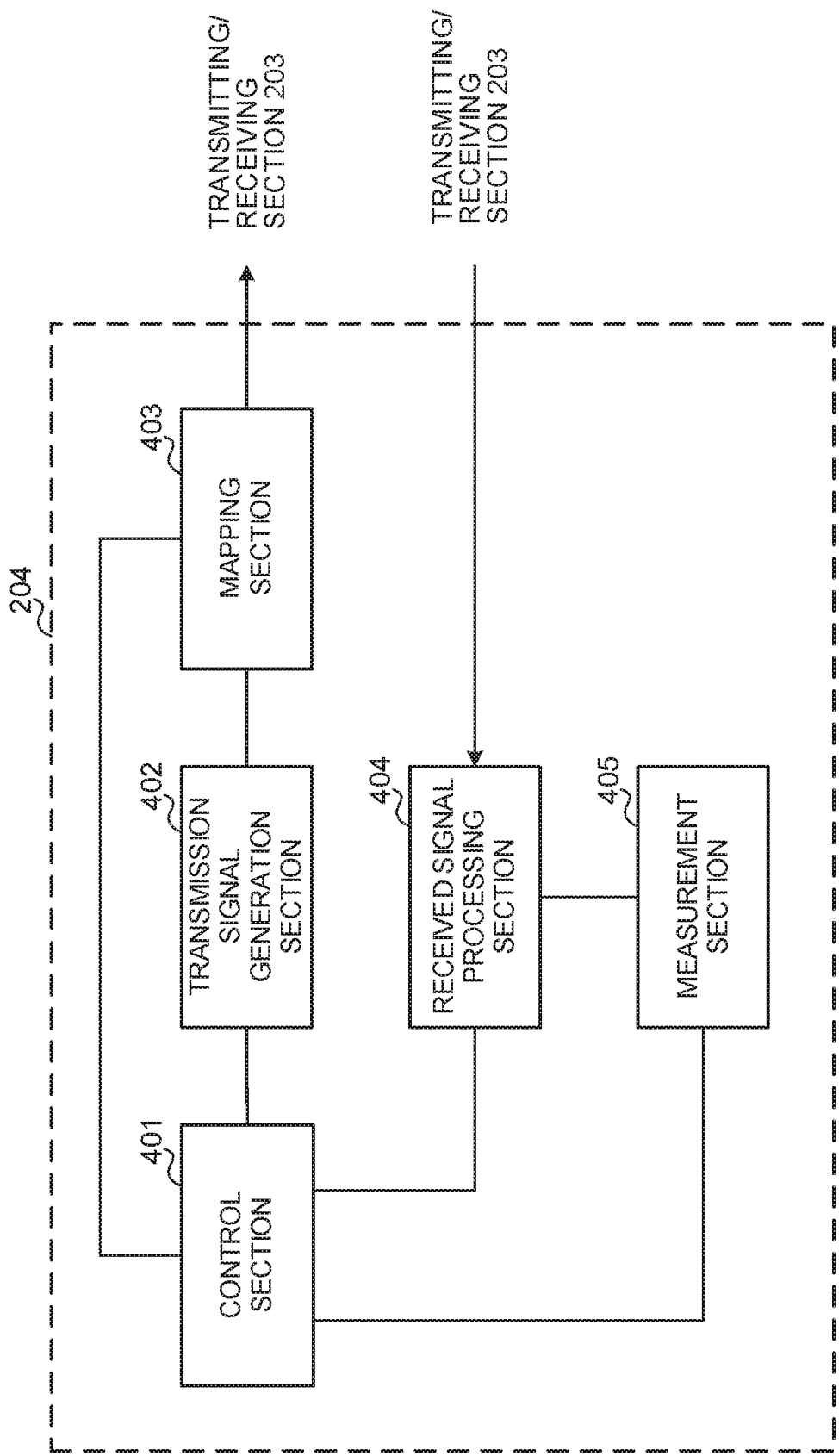
FIG. 15 is a diagram to show an example of a functional structure of a user terminal according to one embodiment of the present invention.

FIG. 15 is a diagram to show an example of a functional structure of a user terminal according to one embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 acquires the downlink control signals (signals transmitted in the PDCCH/EPDCCH) and downlink data signals (signals transmitted in the PDSCH) transmitted from the radio base station 10, via the received signal processing section 404. The control section 401 controls the generation of uplink control signals (for example, delivery acknowledgement information and so on) and/or uplink data signals based on the results of deciding whether or not retransmission control is necessary for the downlink control signals and/or downlink data signals, and so on.

The control section 401 may exert control so that transmitting beams and/or receiving beams are formed using the digital BF (for example, precoding) by the baseband signal processing section 204 and/or the analog BF (for example, phase rotation) by the transmitting/receiving sections 203.

For example, the control section 401 receives at least one beam that is directed to the subject terminal, out of a plurality of beams transmitted in a predetermined time period (for example, a sweeping period).

The control section 401 exerts control so that the receiving process is performed assuming that a synchronization signal and a broadcast channel, to which the same beam (beam pattern) is applied, are allocated to the same fields in different transmission time intervals.

In addition, the control section 401 may control the receiving operation so that the paging channel is received by monitoring the resources that are determined according to the detection result of the synchronization signal and/or the broadcast channel received from the radio base station before the random access preamble is transmitted.

The transmission signal generation section 402 generates uplink signals (uplink control signals, uplink data signals, uplink reference signals and so on) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals related to delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

Based on commands from the control section 401, the received signal processing section 404 receives the DL beam-specific MRSs, synchronization signals and broadcast channels which the radio base station transmits by applying beam forming. In particular, the received signal processing section 404 receives the DL beam-specific MRSs transmitted by way of multi-beam transmission from cells employing multi-beam operation (see FIG. 2).

Also, the received signal processing section 404 may also receive a paging message (PCH) and the shared control channel scheduling it, on different symbols or different subframes, based on commands from the control section 401.

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals, the signals after the receiving processes and so on, to the measurement section 405.

The measurement section 405 conducts measurements with respect to the received signals. For example, the measurement section 405 performs measurements using the beamforming RS transmitted from the radio base station 10. The measurement section 405 can be constituted by a measurer, a measurement circuit or measurement apparatus that can be described based on general understanding of the technical field to which the present invention pertains.

The measurement section 405 may measure, for example, the received power (for example, RSRP), the received quality (for example, RSRQ, received SINR), the channel states and so on of the received signals. The measurement results may be output to the control section 401.

The measurement section 405 implements one of the measurement models that have been shown with the first embodiment to the fourth embodiment. The measurement section 405 obtains measurement results (for example, beam-level measurement results, measurement results of individual beams and so on) with respect to one or more beams based on predetermined received signals (for example, DL beam-specific MRSs). The measurement section 405 has a cell-level conversion section 51 (or 52 or 53) that converts measurement results pertaining to beams into a cell-level measurement result, an L1 filter 21 (or 22) that applies layer 1 filtering, an L3 filter 31 (or 32 or 33) that applies layer 3 filtering, and an evaluation section 41 that evaluates whether a beam-level measurement result and a cell-level measurement result satisfy the standard of reporting.

For example, the measurement section 405 acquires a cell-level measurement result using measurement results pertaining to one or more beams before layer 1 filtering is applied (first embodiment). Also, the measurement section 405 may acquire a cell-level measurement result using measurement results pertaining to one or more beams after layer 1 filtering is applied and before layer 3 filtering is applied (second embodiment).

Also, the measurement section 405 may also acquire a cell-level measurement result using measurement results pertaining to one or more beams after layer 3 filtering is applied (third embodiment). Also, the measurement section 405 may also acquire a cell-level measurement result using measurement results pertaining to one or more beams obtained based on predetermined signals detected during a predetermined time period (fourth embodiment).

Note that the control section 401 controls the transmission signal generation section 302 and the mapping section 303 to transmit the cell-level measurement results and/or the beam-level measurement results output from the evaluation section 41.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 16:
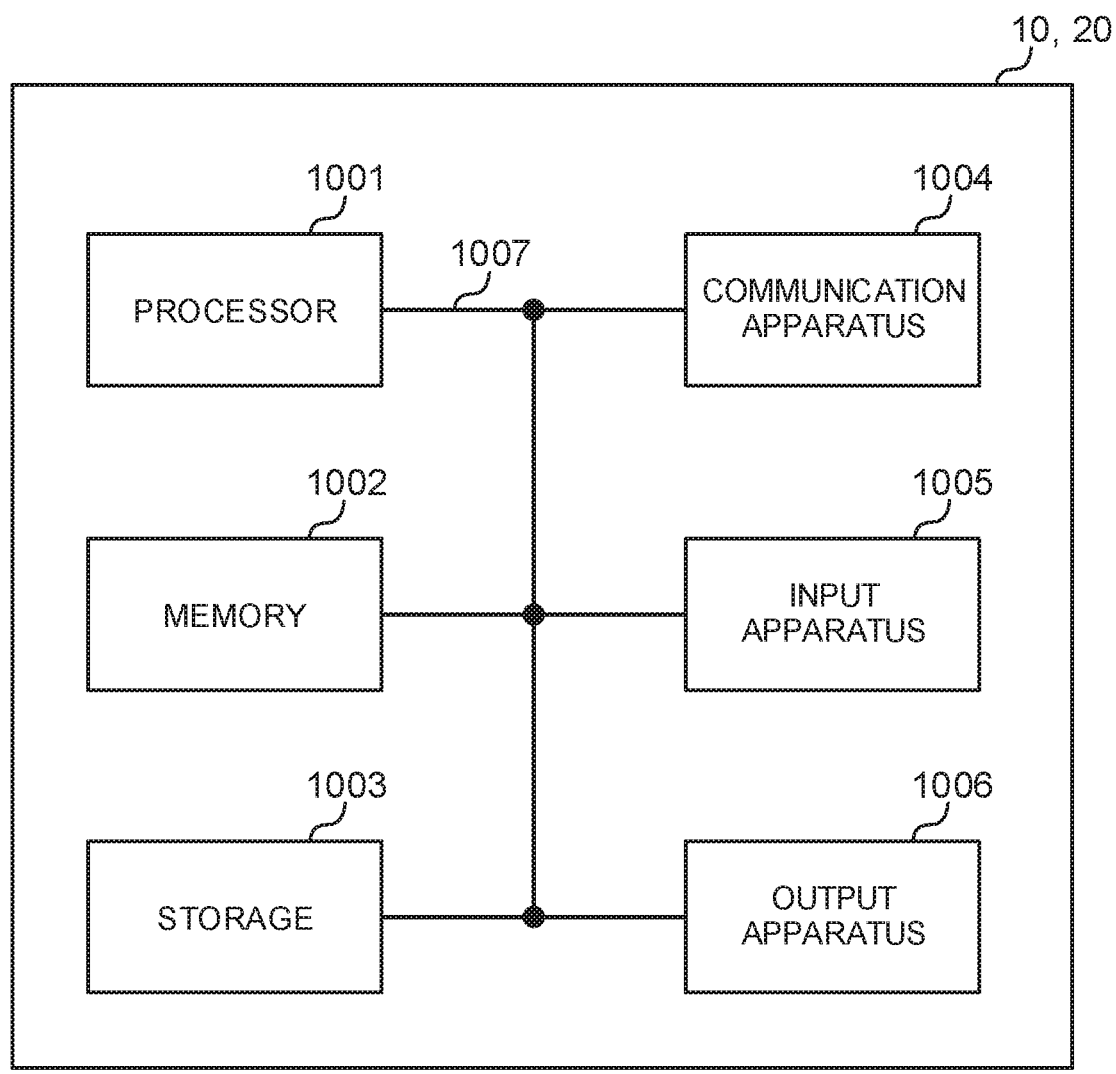
FIG. 16 is a diagram to show an example hardware structure of a radio base station and a user terminal according to one embodiment of the present invention.

For example, the radio base station, user terminals and so on according to embodiments of the present invention may function as a computer that executes the processes of the radio communication method of the present invention. FIG. 16 is a diagram to show an example hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and/or the like for implementing the radio communication methods according to embodiments of the present invention.

The storage 1003 is a computer-readable recording medium, and may be constituted by, for example, at least one of a flexible disk, a floppy (registered trademark) disk, an opto-magnetic disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Further, a radio frame may be comprised of one or more periods (frames) in the time domain. Each of one or more periods (frames) constituting a radio frame may be referred to as a "subframe." Further, a subframe may be comprised of one or more slots in the time domain. A subframe may be a fixed time duration (for example, one ms) not dependent on the neurology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on neurology. Also, a slot may include a plurality of mini-slots. Each mini-slot may consist of one or more symbols in the time domain. Also, a mini-slot may be referred to as a "subslot."

A radio frame, a subframe, a slot, a mini-slot and a symbol all represent the time unit in signal communication. A radio frame, a subframe, a slot, a mini-slot and a symbol may be each called by other applicable names. For example, one subframe may be referred to as a "transmission time interval (TTI)," or a plurality of consecutive subframes may be referred to as a "TTI," or one slot or mini-slot may be referred to as a "TTI." That is, a subframe and/or a TTI may be a subframe (one ms) in existing LTE, may be a shorter period than one ms (for example, one to thirteen symbols), or may be a longer period of time than one ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that when a TTI is given, the time interval (for example, the number of symbols) in which transport blocks, code blocks and/or codewords are actually mapped may be shorter than the TTI.

Note that, when one slot or one mini-slot is referred to as a "TTI," one or more TTIs (that is, one or more slots or one or more mini-slots) may be the minimum time unit of scheduling. Also, the number of slots (the number of mini-slots) to constitute this minimum time unit of scheduling may be controlled.

A TTI having a time duration of one ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," "a partial TTI (or a "fractional TTI"), a "shortened subframe," a "short subframe," a "mini-slot," "a sub-slot" and so on.

Note that a long TTI (for example, a normal TTI, a subframe, etc.) may be replaced with a TTI having a time duration exceeding one ms, and a short TTI (for example, a shortened TTI) may be replaced with a TTI having a TTI length less than the TTI length of a long TTI and not less than one ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one mini-slot, one subframe or one TTI in length. One TTI and one subframe each may be comprised of one or more resource blocks. Note that one or more RBs may be referred to as a "physical resource block (PRB: Physical RB)," a "subcarrier group (SCG: Sub-Carrier Group)," a "resource element group (REG)," an "PRB pair," an "RB pair" and so on.

Furthermore, a resource block may be comprised of one or more resource elements (REs). For example, one RE may be a radio resource field of one subcarrier and one symbol.

Note that the structures of radio frames, subframes, slots, mini-slots, symbols and so on described above are merely examples. For example, configurations pertaining to the number of subframes included in a radio frame, the number of slots included in a subframe, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented in other information formats. For example, radio resources may be specified by predetermined indices, In addition, equations to use these parameters and so on may be used, apart from those explicitly disclosed in this specification.

The names used for parameters and so on in this specification are in no respect limiting. For example, since various channels (PUCCH (Physical Uplink Control Channel), PDCCH (Physical Downlink Control Channel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input may be transmitted to other pieces of apparatus. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages" and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," a "NodeB," an "eNodeB (eNB)," an "access point," a "transmission/ reception point (TRP)," a "transmission point," a "reception point," a "femto cell," a "small cell," and suchlike terms.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs: Remote Radio Heads)). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Further, the radio base stations in this specification may be interpreted as user terminals. For example, each aspect/embodiment of the present invention may be applied to a configuration in which communication between a radio base station and a user terminal is replaced with communication among a plurality of user terminals (D2D: Device-to-Device). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The examples/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

The examples/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method for distinguishing between two or more elements. Thus, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure, ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. For example, "connection" may be interpreted as "access." As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

The phrase "A and B are different" as used in the present specification or claims may indicate that A and B are mutually different.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2017-001438, filed on Jan. 6, 2017, including the specification, drawings and abstract, is incorporated herein by reference in its entirety.

The invention claimed is:

1. A terminal comprising:

a receiver that receives a plurality of beams; and a processor that obtains measurement results for the plurality of beams before applying layer 3 filtering, and obtains a cell level measurement result by averaging measurement results for N beams having a quality that exceeds a threshold among the measurement results for the plurality of beams, wherein the N is a value that indicates a number of the measurement results used for obtaining the cell level measurement result, and the value N and the threshold are provided using a system information block (SIB).

2. The terminal according to claim 1, wherein the processor obtains the measurement results for the plurality of beams after applying layer 1 filtering.

3. A radio communication method comprising:

receiving a plurality of beams; and obtaining measurement results for the plurality of beams before applying layer 3 filtering; and obtaining a cell level measurement result by averaging measurement results for N beams having a quality that exceeds a threshold among the measurement results for the plurality of beams, wherein the N is a value that indicates a number of the measurement results used for obtaining the cell level measurement result, and the value N and the threshold are provided using a system information block (SIB).

* * * * *